(12) United States Patent
Mueller et al.

(10) Patent No.: US 9,764,393 B2
(45) Date of Patent: Sep. 19, 2017

(54) KEY BLANK AND CARRIER ADAPTED FOR POSITIONING A KEY BLANK IN A CUTTER DURING BIT CUTTING

(71) Applicant: The Hillman Group, Inc., Cincinnati, OH (US)

(72) Inventors: Michael A. Mueller, Phoenix, AZ (US); George Lynn Hagen, Las Vegas, NV (US); Scott Basham, Chandler, AZ (US); Mark Tarter, Mesa, AZ (US); Ryan Hamblin, Apache Junction, AZ (US); Carl Ito, Scottsdale, AZ (US); Kenneth C. Booth, Mesa, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

(21) Appl. No.: 15/424,318

(22) Filed: Feb. 3, 2017

(65) Prior Publication Data
US 2017/0144233 A1 May 25, 2017

Related U.S. Application Data

(60) Division of application No. 13/728,890, filed on Dec. 27, 2012, now Pat. No. 9,586,272, which is a (Continued)

(51) Int. Cl.
*B23C 3/35* (2006.01)
*B23C 9/00* (2006.01)

(52) U.S. Cl.
CPC .............. *B23C 3/35* (2013.01); *B23C 9/00* (2013.01); *B23C 3/355* (2013.01);
(Continued)

(58) Field of Classification Search
CPC ....... B23C 3/35; B23C 3/355; B23C 2235/28; B23C 2235/00; Y10T 409/301064;
(Continued)

(56) References Cited

U.S. PATENT DOCUMENTS 690,116 A * 12/1901 Muller .................... A47L 13/08
15/236.08
1,439,370 A * 12/1922 Lambert ................ B23D 79/00
29/81.11
(Continued)

FOREIGN PATENT DOCUMENTS

DE 10031713 A1 1/2002
DE 102007057407 A1 5/2009
(Continued)

*Primary Examiner* — Sunil K Singh
*Assistant Examiner* — Ryan Rufo
(74) *Attorney, Agent, or Firm* — Finnegan, Henderson, Farabow, Garrett & Dunner LLP

(57) ABSTRACT

Implementations of key blank carriers or key blanks with a standard reference features may include alignment features on a key blank head, key blank tip, a key blank carrier coupled to a key blank sleeve and/or a key blank sleeve, and any feature directly attached to any portion of the key that may be used for referencing in the key duplication system, or any combination of these. The standard reference features may allow any key blank brand model to interface with the machine so as to consistently align each key, regardless of its make and model, for cutting in a universally configured key blank clamp that is clamped to reduce the movement of the key blank during duplication cutting.

10 Claims, 18 Drawing Sheets

Related U.S. Application Data continuation-in-part of application No. 13/183,982, filed on Jul. 15, 2011, now Pat. No. 9,073,133.

(60) Provisional application No. 61/364,644, filed on Jul. 15, 2010, provisional application No. 61/413,099, filed on Nov. 12, 2010, provisional application No. 61/497,468, filed on Jun. 15, 2011.

(52) U.S. Cl.
CPC . *B23C 2235/28* (2013.01); *Y10T 409/300952* (2015.01); *Y10T 409/301064* (2015.01); *Y10T 409/50082* (2015.01); *Y10T 409/501476* (2015.01)

(58) Field of Classification Search
CPC . Y10T 409/300952; Y10T 409/301088; Y10T 409/50082; Y10T 409/502132; Y10T 409/50164; Y10T 409/501476; B23B 2220/48; B23Q 33/00
See application file for complete search history.

(56) References Cited

U.S. PATENT DOCUMENTS

| | | | |
|---|---|---|---|
| 1,889,461 A | 11/1932 | Hansen | |
| 2,148,667 A | 2/1939 | Yoskowitz et al. | |
| 2,404,500 A * | 7/1946 | Conrad | B29C 37/02 |
| | | | 409/297 |
| 3,116,665 A | 1/1964 | Reisner | |
| 3,323,420 A | 6/1967 | Roxburgh | |
| 3,327,588 A * | 6/1967 | Yandell | B23D 79/00 |
| | | | 30/170 |
| 3,358,561 A | 12/1967 | Roxburgh et al. | |
| 3,413,892 A | 12/1968 | Casey et al. | |
| 3,442,174 A | 5/1969 | Weiner et al. | |
| 3,602,092 A | 8/1971 | Richens | |
| 3,682,041 A | 8/1972 | Essig | |
| 3,748,940 A | 7/1973 | Muri | |
| 3,769,865 A | 11/1973 | Kleist | |
| 3,796,130 A | 3/1974 | Gartner | |
| 3,865,011 A | 2/1975 | Patriquin | |
| 3,978,764 A | 9/1976 | Patriquin | |
| 4,012,991 A | 3/1977 | Uyeda | |
| 4,159,783 A | 7/1979 | Crasnianski | |
| 4,426,179 A * | 1/1984 | Jefferson | B23C 3/35 |
| | | | 340/680 |
| 4,614,465 A | 9/1986 | Wu | |
| 4,666,351 A | 5/1987 | Marchal | |
| 4,741,652 A | 5/1988 | Marchal | |
| 4,752,876 A | 6/1988 | Couch et al. | |
| 5,054,201 A * | 10/1991 | Andrews | B23B 27/1662 |
| | | | 15/236.08 |
| 5,167,171 A | 12/1992 | Heredia | |
| 5,172,829 A | 12/1992 | Dellicker, Jr. | |
| 5,311,758 A | 5/1994 | Neitzke et al. | |
| 5,360,299 A | 11/1994 | Oliana | |
| 5,590,990 A * | 1/1997 | Hershkovitz | B23D 79/08 |
| | | | 30/170 |
| 5,807,042 A | 9/1998 | Almblad et al. | |
| 7,685,718 B2 * | 3/2010 | Ames | B23B 5/167 |
| | | | 30/299 |
| 2006/0062644 A1 | 3/2006 | Foscan et al. | |
| 2008/0226408 A1 | 9/2008 | Belflower et al. | |
| 2012/0014762 A1 | 1/2012 | Ryai, Sr. et al. | |
| 2015/0093208 A1 | 4/2015 | Litwinski | |

FOREIGN PATENT DOCUMENTS

| | | |
|---|---|---|
| EP | 0362007 A2 | 4/1990 |
| WO | WO 2008/066857 A2 | 6/2008 |

* cited by examiner

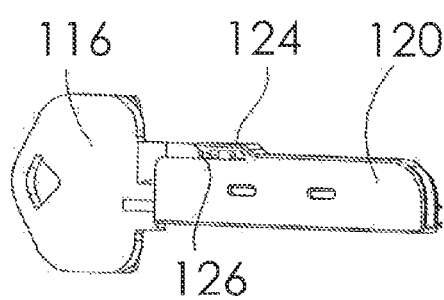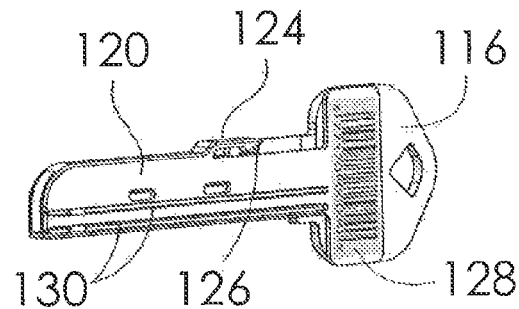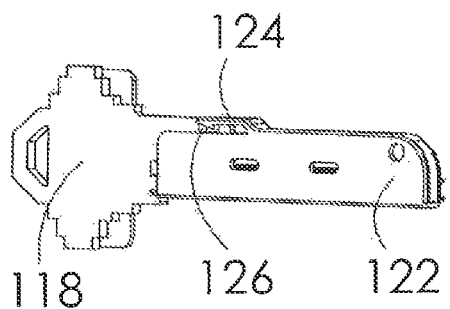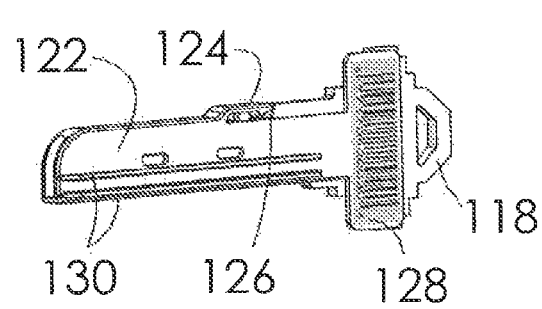
FIG. 7A  FIG. 7B
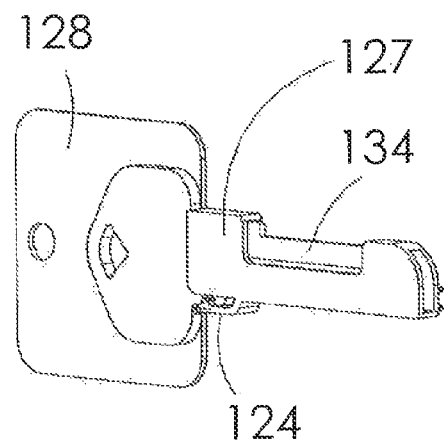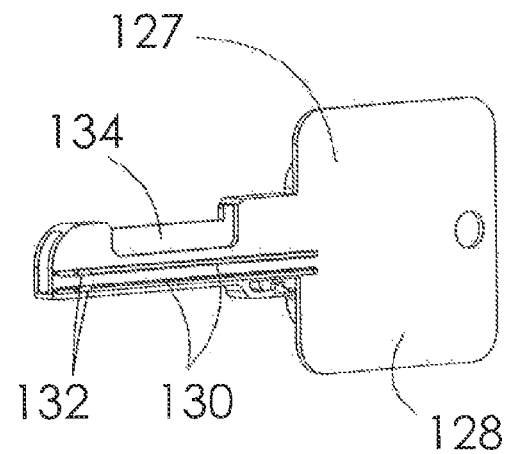
FIG. 8A  FIG. 8B

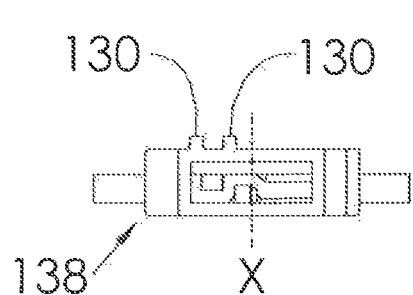
FIG. 10A
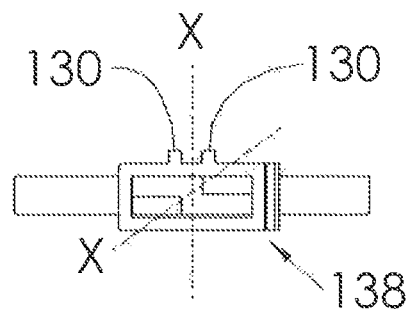
FIG. 10B
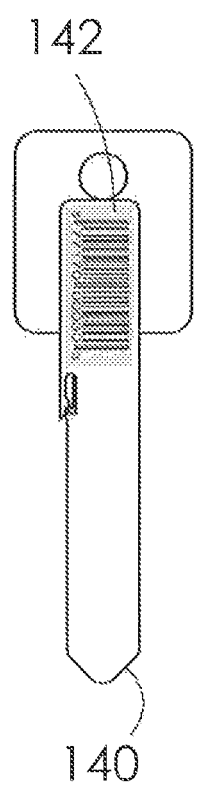
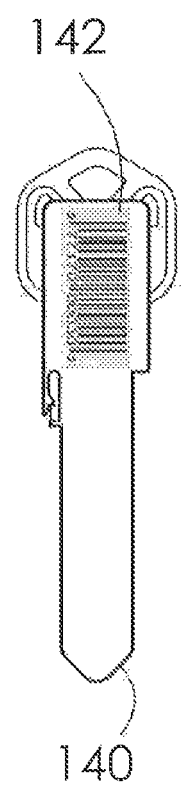
FIG. 11A
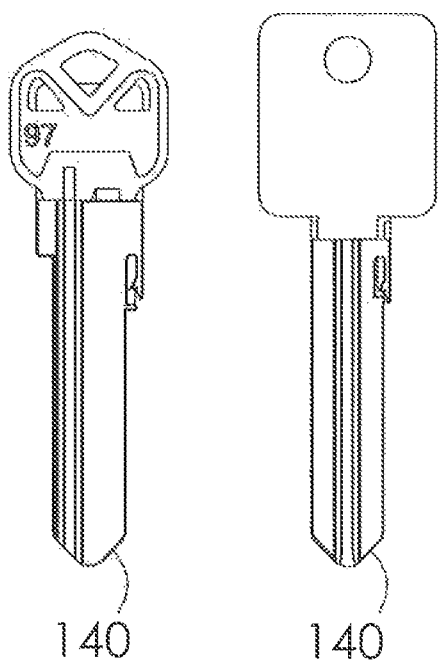
FIG. 11B

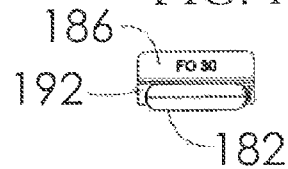
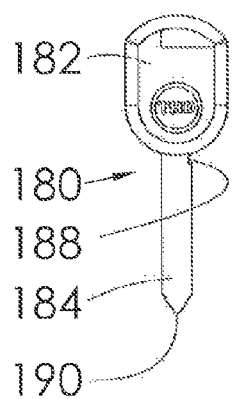
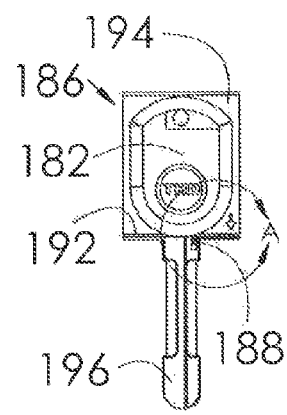
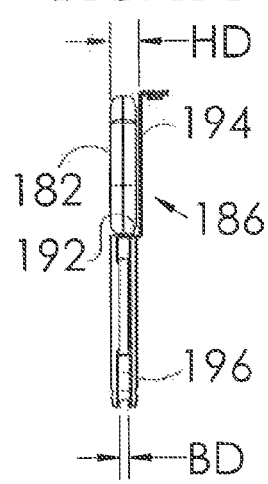
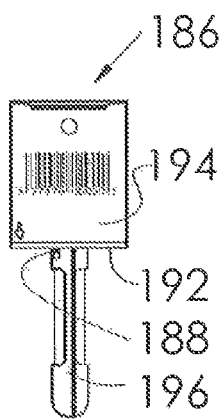
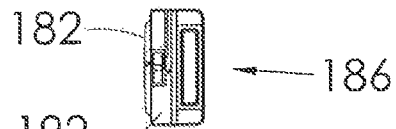
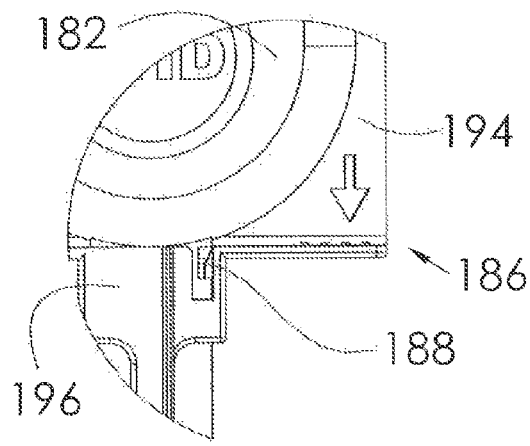

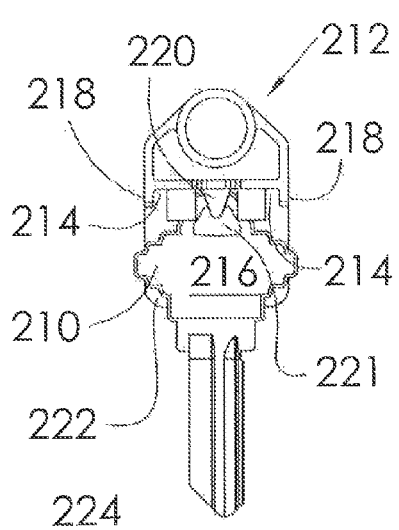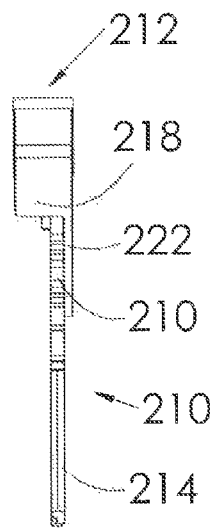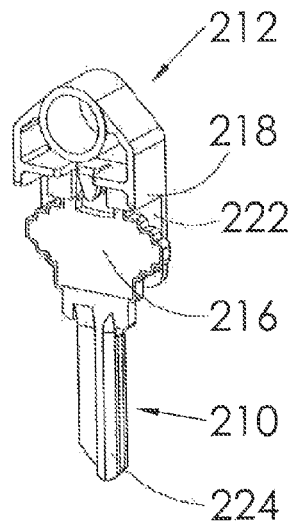
FIG. 16A　　　FIG. 16B　　　FIG. 16C
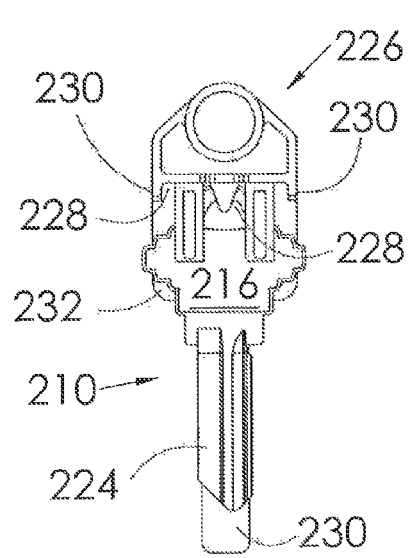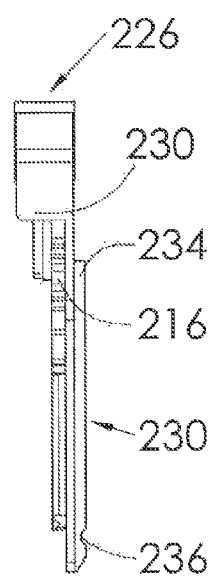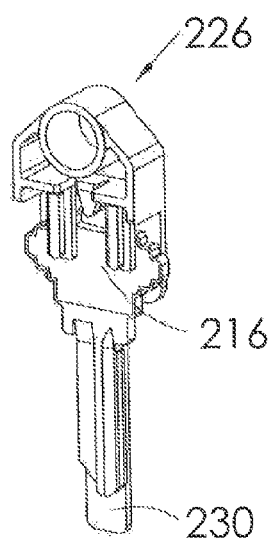
FIG. 17A　　　FIG. 17B　　　FIG. 17C

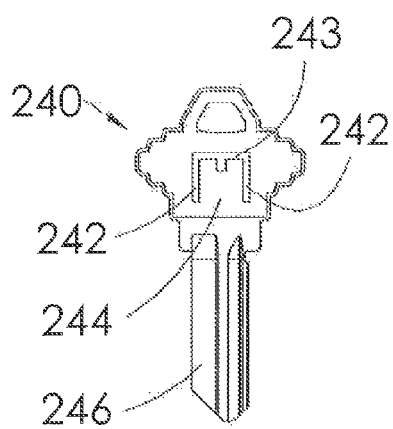
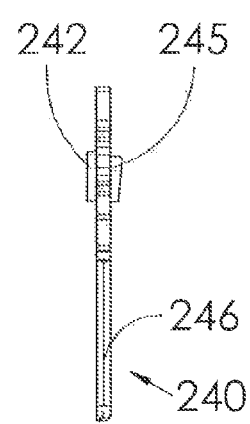
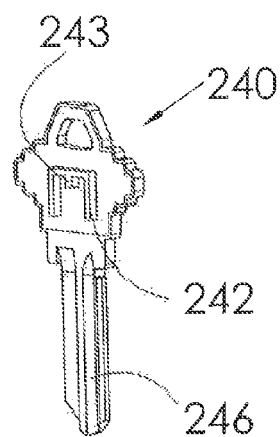
FIG. 18A     FIG. 18B     FIG. 18C
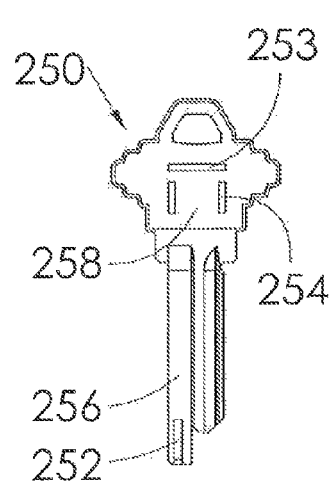
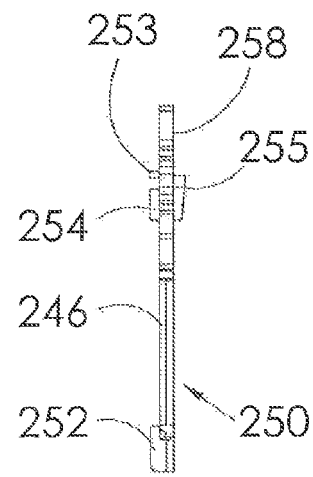
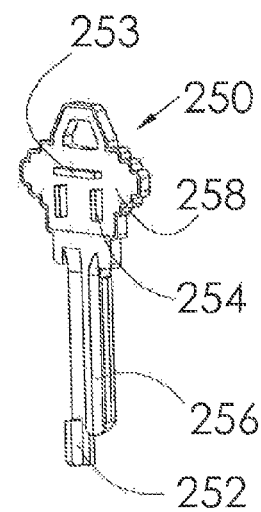
FIG. 19A     FIG. 19B     FIG. 19C

KEY BLANK AND CARRIER ADAPTED FOR POSITIONING A KEY BLANK IN A CUTTER DURING BIT CUTTING

CROSS REFERENCE TO RELATED APPLICATIONS

This document is a divisional application o U.S. patent application Ser. No. 13/728,890 to Mueller et al. entitled "Key Blank and Carrier Adapted for Positioning a Key Blank in a Cutter During Bit Cutting," pending, which was filed Dec. 27, 2012 and is a Continuation-in-Part of U.S. patent application Ser. No. 13/183,982 to Mueller, et al. entitled "Key Blank and Carrier Adapted for Positioning a Key Blank in a Cutter During Bit Cutting," now U.S. Pat. No. 9,073,133, which was filed on Jul. 15, 2011 and claims the benefit of the filing dates of U.S. Provisional Patent Applications: 61/364,644 to Hagen et al. entitled "Key Duplication Packaging and Standard Reference Features," which was filed on Jul. 15, 2010; 61/413,099 to Hagen et al. entitled "Key Duplication Machine Cutting System," which was filed on Nov. 12, 2010; and 61/497,468 to Hagen et al, entitled "Key Packaging and Duplication Systems," which was filed on Jun. 15, 2011; the disclosures of each of which are hereby incorporated herein by reference.

BACKGROUND

1. Technical Field

Aspects of this document relate generally to key duplication. More specific implementations involve individual carriers for key blanks which may be used as display and/or product dispensing packaging that aligns and positions a key blank in a key blank cutter without the need for a separate clamp for each key type and model.

2. Background Art

Conventionally, when a master key for opening a lock is duplicated, it is conventionally duplicated by first classifying the master key to be able to identify an appropriate key blank into which to cut a bit pattern for the duplicate key, selecting the appropriate key blank to match the master key, placing the selected key blank in a key cutter, and cutting the bit pattern from the master key into a blade of the key blank. Conventional systems have required the operation skills of a trained worker to properly select the appropriate key blank. An example of an elaborate system used to assist a trained worker in selecting an appropriate key blank and appropriately positioning and clamping the appropriate key blank and master key for cutting is disclosed in U.S. Pat. No. 5,443,339 to Heredia et al., titled "Method and Apparatus for Aligning and Cutting Single-sided and Double Sided Keys." In Heredia, a plurality of cassettes, each comprising its own clamp and cutter fixturing is provided. The trained worker selects an appropriate key blank, an appropriate cassette for the particular key blank and clamps the key blank into the cassette. Then the trained worker couples the cassette with a cutting wheel for cutting. More recent master key identification systems, such as that disclosed in U.S. Pat. No. 6,836,553 to Campbell et al., titled "Key Identification System," the disclosure of which is hereby incorporated herein by reference, automatically identifies the appropriate key blank and indicates that number for key selection.

A recent key duplication system described in International Application Number PCT/US2007/024522 to Freeman, et al. titled "Fully Automatic Key Duplicating Machine with Automatic Key Model Identification System" sought to reduce the need for the operation skills of a trained worker by automatically identifying master keys and automatically cutting and dispensing a duplicate key from a limited selection of keys within the key duplication system. Another recent key duplication system described in U.S. Pat. No. 7,890,878 to Bass et al., titled "Object Identification System," discloses a system that identifies an appropriate key blank by flashing a light adjacent the appropriate key blank on a product display next to a key blank cutter so that the user or a trained worker can select the appropriate key for insertion into the key blank cutter. Other systems require changing of clamps for different key blank models to enable secure positional clamping of the different key blank models in relation to the cutting wheel of a key blank cutter.

Each key blank type and model is a little bit, and sometimes a lot, different from the others in its relative dimensions and keyway dimensions and placements. As a result, efforts to eliminate the necessity for the operation skills of a trained worker has yielded difficulties in enabling a system to cut the wide variety of master key types and models accurately with little or no skill have yielded a relatively high rate of miscue keys from reasons such as an incorrect key blank being selected, a key blank being inserted backwards or not far enough, and from a key blank being moved during cutting due to not being clamped securely. Each of these issues may result in a duplicate key being cut that does not match the master key and will not work in the lock. Many times, however, the user who cuts a key or even the trained worker who cuts a key is not aware that the duplicate key has an error until the user tries the key in the lock at home and is frustrated that another trip to the store is required to replace the miscut key.

SUMMARY

A key blank cutting carrier adapted for mechanical interface with a key blank cutter may comprise a key blank carrier, a key blank recess within the carrier, the recess comprising at least two walls and sized and shaped to securely receive at least a portion of a key blank within the recess, and at least one key blank cutter alignment feature extending from a surface of the carrier at an angle of at least 20 degrees relative to the surface, the at least one key blank cutter alignment feature positioned on the carrier to mechanically engage a portion of a key blank cutter into which a portion of the key blank carrier is placed and align the key blank with the key blank cutter.

Particular embodiments may comprise one or more of the following features. The key blank cutter alignment feature may extend lengthwise along at least a portion of a first wall of the at least two walls of the key blank recess. The at least one key blank cutter alignment feature may comprise a first side extending from the carrier at the angle of at least 20 degrees converging toward a second side extending from the carrier at an angle of about 90 degrees. The key blank cutter alignment feature may be integrally forced with the key blank carrier. The key blank carrier may have an opening along a first edge thereof. The opening may comprise a beveled edge extending for at least a portion of the opening. The opening may be V-shaped. The carrier may comprise an elongated sleeve defining at least a portion of the key blank recess, wherein the sleeve further comprises a tip end and a head end, the head end comprising a substantially planar surface, the tip end being at least partly formed by the at least two walls and at least two additional walls, wherein the tip end at least two walls and at least two additional walls defining key blade carrier front and back sides and key blade carrier hit and spine sides respectively, the key blade carrier front side comprising at least one aperture extending through the key blade carrier front side along an edge of the front side bordering the key blade carrier spine side. The at least one aperture extending through the key blade carrier front side may comprise at least two apertures extending through the key blade carrier front side along the edge of the front side bordering the key blade carrier spine side. The carrier may comprise an elongated sleeve defining at least a portion of the key blank recess, wherein the sleeve further comprises a tip end and a head end, the head end comprising a substantially planar surface, the tip end being at least partly formed by the at least two walls and at least two additional walls, wherein the tip end at least two walls and at least two additional walls defining key blade carrier front and back sides and key blade carrier bit and spine sides respectively, the key blade carrier front side comprising at least one aperture extending through the key blade carrier front side along an edge of the front side on the key blade carrier bit side. The key blank carrier may comprise a key blank positioned within the recess in direct contact with the at least two walls. The carrier may comprise an elongated sleeve defining at least a portion of the key blank recess, wherein the sleeve further comprises a tip end and a head end, the head end comprising a substantially planar surface, the tip end being at least partly formed by the at least two walls and at least two additional walls, wherein the tip end at least two walls and at least two additional walls defining key blade carrier front and back sides and key blade carrier bit and spine sides respectively, the key blade carrier front side comprising at least one aperture extending through the key blade carrier front side along an edge of the front side on the key blade carrier bit side, the key blade carrier bit side further comprises a shoulder band adjacent to the head end between the head end and the at least one aperture, the shoulder band extending from the front side of the key blade carrier to the back side of the key blade carrier.

A key blank cutting carrier adapted for mechanical interface with a key blank cutter may comprise a key blank carrier body, a key blank recess within the key blank carrier body, the recess defined by at least two walls and sized and shaped to securely receive at least a portion of a key blank within the recess, at least one key blank cutter alignment feature coupled to the carrier body and positioned on the carrier body to mechanically engage a portion of a key blank cutter into which a portion of the key blank carrier is placed, and a key blank burr removal opening in a first edge of the carrier body.

Particular embodiments may comprise one or more of the following features. The key blank burr removal opening may comprise a beveled edge. The key blank burr removal opening may comprise a V-shaped opening. The key blank carrier body may further comprise a substantially planar surface, and the first edge of the carrier body forming a first edge of the substantially planar surface. The carrier may comprise an elongated sleeve defining at least a portion of the key blank recess, wherein the sleeve further comprises a tip end and a head end, the head end comprising a substantially planar surface, the tip end being at least partly formed by the at least two walls and at least two additional walls, wherein the tip end at least two walls and at least two additional walls defining key blade carrier front and back sides and key blade carrier bit and spine sides respectively, the key blade carrier front side comprising at least one aperture extending through the key blade carrier front side along an edge of the front side bordering the key blade carrier spine side. The at least one aperture may extend through the key blade carrier front side comprises at least two apertures extending through the key blade carrier front side along the edge of the front side bordering the key blade carrier spine side. The carrier may comprise an elongated sleeve defining at least a portion of the key blank recess, wherein the sleeve further comprises a tip end and a head end, the head end comprising a substantially planar surface, the tip end being at least partly formed by the at least two walls and at least two additional walls, wherein the tip end at least two walls and at least two additional walls defining key blade carrier front and back sides and key blade carrier bit and spine sides respectively, the key blade carrier front side comprising at least one aperture extending through the key blade carrier front side along an edge of the front side on the key blade carrier bit side, the key blade carrier bit side further comprises a shoulder band adjacent to the head end between the head end and the at least one aperture, the shoulder band extending from the front side of the key blade carrier to the back side of the key blade carrier. The key blank carrier may comprise a key blank positioned within the recess in direct contact with the at least two walls.

A method of cutting a key blank to form a duplicate key may comprise inserting a key blank positioned in a key blank carrier into an opening in a key blank cutter, cutting a key bit pattern of a master key into the key blank with a key blank cutting wheel, removing the cut key blank and key blank carrier from the key blank cutter, separating the cut key blank from the key blank carrier, and moving a blade of the cut key blank along a key blank burr removal opening on the key blank carrier until at least one burr is removed from the blade of the cut key blank.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Particular illustrative implementations will hereinafter be described in conjunction with the appended drawings, where like designations denote like elements, and:

FIGS. 7A and 7B are front and back side views of key blank carriers for two different key models illustrating a key blank security feature;

FIGS. 8A and 8B are front and back side views of a key blank carrier illustrating a portion of the key blade sleeve removed in combination with a key blank security feature;

FIGS. 10A and 10B are distal tip end views of two different key carriers;

FIGS. 11A and 11B are front and back side views of key blank carriers for two different key models illustrating a different sized flag in combination with a key blank security feature;

FIGS. 15A-15G are views of a key blank with an oversized head and a key blank carrier with a step between the substantially planar flag and the key blank recess;

FIGS. 16A-16C are front, side and perspective views of a key blank carrier comprising a key blank recess configured to receive a key blank head;

FIGS. 17A-17C are front, side and perspective views of a key blank carrier like that of FIGS. 16A-16C but comprising additional alignment features;

FIGS. 18A-18C are front, side and perspective views of a key blank with an alignment feature on the key tip; and FIG. 19A-19C are front, side and perspective views of a key blank with an alignment feature on the key head.

DESCRIPTION

This disclosure, its aspects and implementations, are not limited to the specific components, use or assembly procedures disclosed herein. Many additional components and assembly procedures known in the art consistent with the intended key blanks, key blank carriers and/or assembly or cutting procedures for a key blank will become apparent for use with implementations of key blanks and carriers from this disclosure. Accordingly, for example, although particular key blanks and/or carriers are disclosed, such key blanks, carriers and implementing components may comprise any shape, size, style, type, model, version, measurement, concentration, material, quantity, and/or the like as is known in the art for such key blanks, carriers and implementing components, consistent with the intended operation and use of a key blank or carrier.

Implementations of key blank carriers or key blanks with a standard reference features may include alignment features on a key blank head, key blank tip, a key blank carrier coupled to a key blank sleeve and/or a key blank sleeve, and any feature directly attached to any portion of the key that may be used for referencing in the key duplication system, or any combination of these. Alignment of a key blank, and the alignment features on a key blank carrier or key blank, comprises alignment in the spatial x-y-z sense and may also comprise orientational or rotational alignment. The standard reference features on a key blank carrier or may allow any key blank brand model to interface with the machine so as to consistently align each key, regardless of its make and model, in a proper position in relation to a key blank cutter and in a proper orientation for cutting in a universally configured key blank clamp that is adapted to the standard reference features and clamped to reduce the movement of the key blank during duplication cutting.

Figure 1:
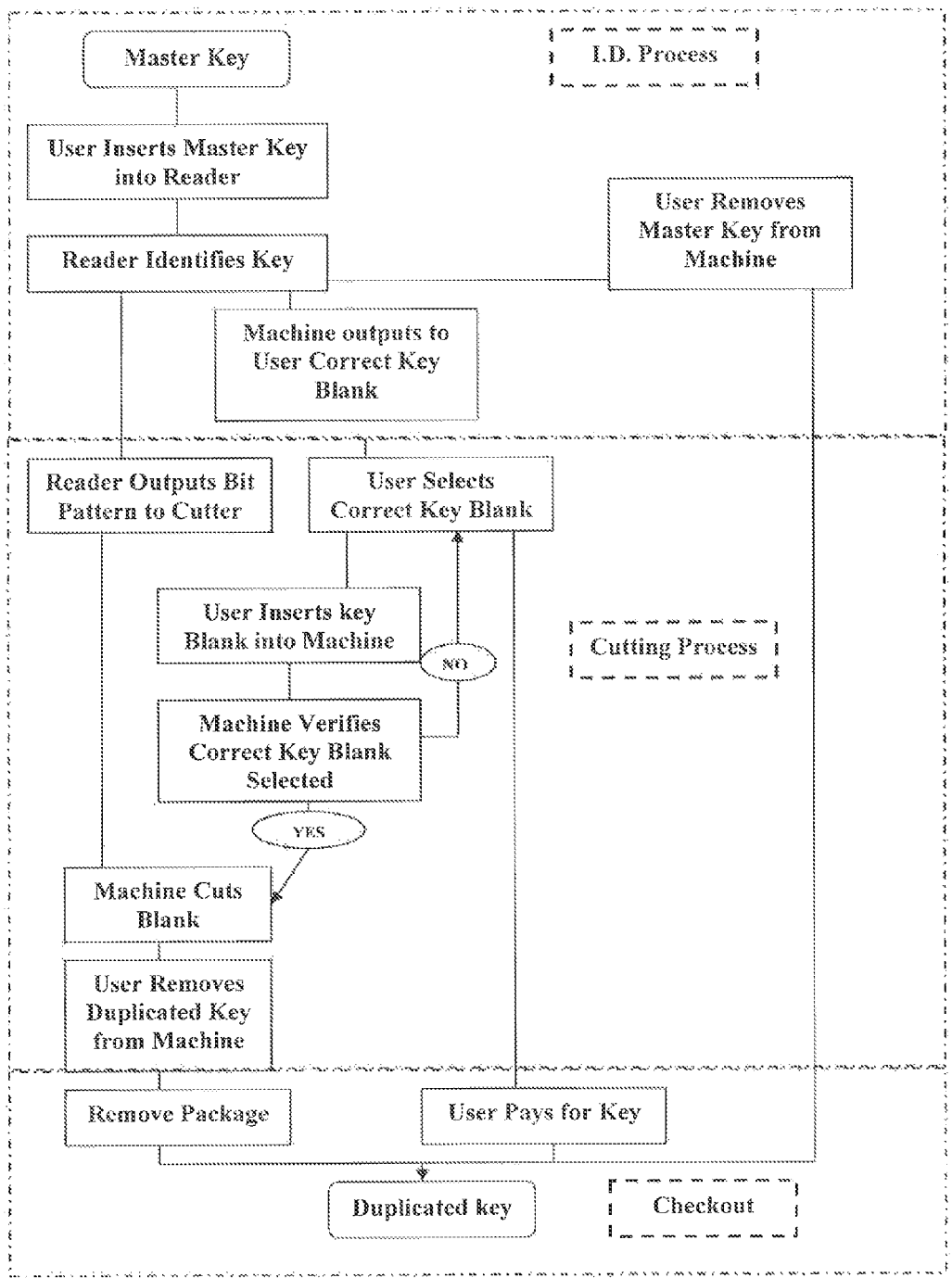
FIG. 1 is a block diagram of a specific key duplication process embodiment.

An overview for a process of enabling a user to cut its own duplicate key is illustrated in FIG. 1. In particular embodiments, the key blank may be vended from an associated key blank vending machine in communication with the master key identifier. In other particular embodiments, other additional methods and/or system components may be used as well. The specific identification process used to identify the master key make, model and bit pattern for selection of an appropriate key blank is not crucial to the present disclosure and any method may be used in combination with the present disclosure. The specific cutting and checkout processes are also not crucial to the present disclosure and any discussion of them is provided as an example for clarity of discussion and is not intended as a limitation for use of the key blank carriers discussed herein.

The present disclosure relates to a carrier associated with the key blank and may be used for displaying or dispensing the key blank in addition to its use as a fixture for holding the key during the cutting process and even as the key blank packaging at checkout. Whether called a carrier or packaging, its use with standard external features enables a key blank cutter to have a standard key blank receiving aperture and standard key blank carrier clamping components despite the large variations between various key blanks, enabling the key blank cutter to have a standardized key blank clamp to cut all side-cut key blanks using the same key blank clamp rather than the conventional systems which required a plurality of separate clamp units.

Figure 2A:
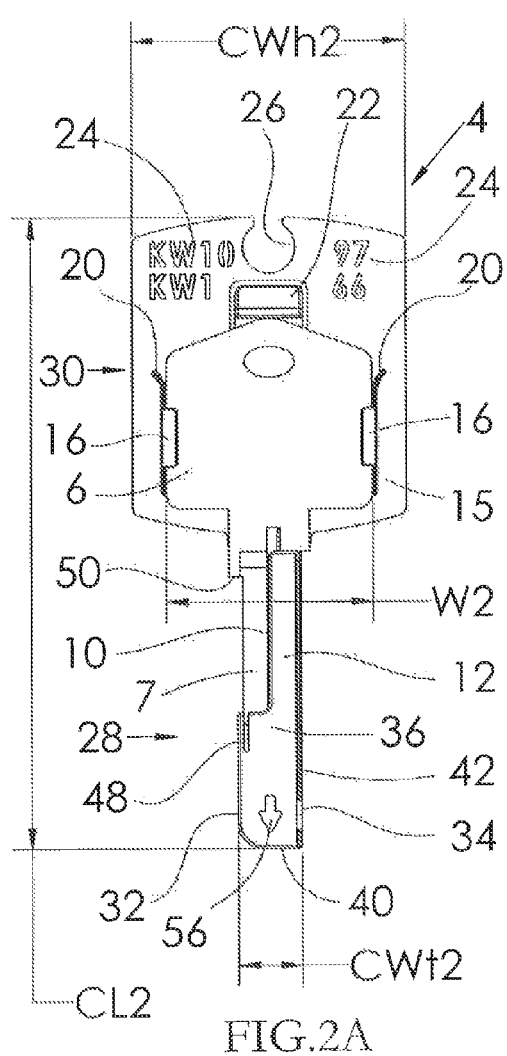
FIGS. 2A and 2B are a front views of key blank carriers illustrating a first set of features.
Figure 2B:
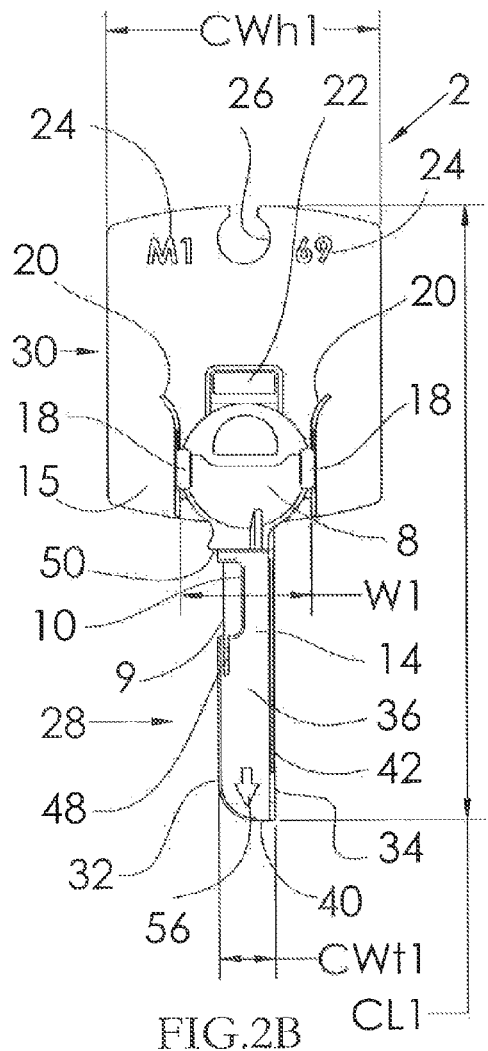

FIGS. 2A and 2B illustrate a particular implementation of a key blank carrier 2, 4, adapted to two very different key blanks 6, 8. Despite the very different key blank 6, 8 sizes and shapes, the key blank carriers 2, 4 each have common features and characteristics to enable use of the two key blank carriers 2, 4 in the same key cutter (see example of FIG. 4). In this particular implementation, the key blank carriers 2, 4 each comprise a key blank recess 10 at least partially within a key blade sleeve 12, 14.

The key blank carrier 2, 4 of FIGS. 2A and 2B each comprises a tip end 28 having a width CWt1, CWt2, and a head end 30 having a width CWh1, CWh2, and a total length CL1, CL2. The head end 30 comprises a substantially planar carrier flag 15 extends from the key blade sleeve 12, 14 toward the key blank 6, 8 head. The substantially planar carrier flag 15 comprises a key blank head channel 16, 18 adapted for the particular key blank 6, 8 intended for use in the key blank carrier 2, 4. The key blank head channels 16, 18 of the particular implementation of FIGS. 2A and 2B each have a width W1, W2 and a depth D (FIG. 3C) sized to receive the particular key blank 6, 8. Although tolerances are not required to be exact, the channels 16, 18 should be sized, in combination with the other features of the respective key blank carriers 2, 4 to contact the key blank 6, 8 heads and retain the key blanks 6, 8 into their designed carrier sufficient for holding the key blank in a desired position in relation to the key blank carrier 2, 4 for cutting in an appropriately configured cutting system. Although the key blank head channels 16, 18 of these particular embodiments illustrate a channel width W defined by two opposing channels 16, 18, each with a depth D, in particular embodiments only one channel 16, 18 may be used if the key blank 6, 8 is otherwise retained into the carrier 2, 4 sufficient for cutting. Openings to the channels 16, 18 of these embodiments comprise a flared wall 20 to assist in insertion of the respective key blanks 6, 8.

Figure 3A:
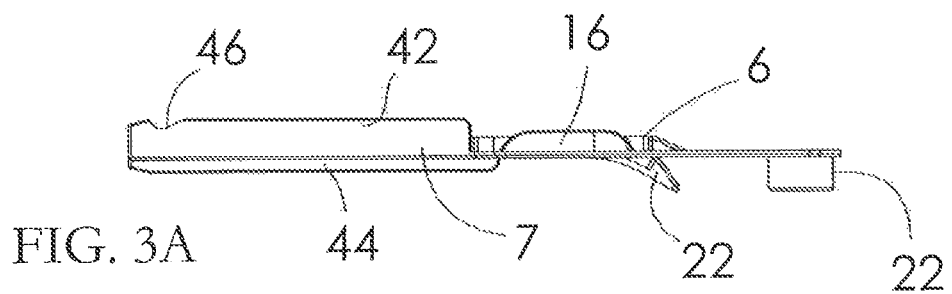
FIG. 3A is a side view of a key blank carrier with a retaining clip in a flexed position.
Figure 3B:
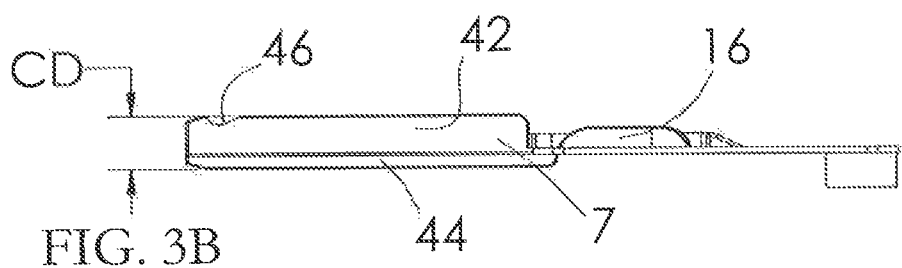
FIG. 3B is a side view of a key blank carrier with a retaining clip in a rest position.

Particular embodiments may comprise a security feature, such as a retaining clip 22 positioned adjacent to the key blank head channel 16, 18. The retaining clip 22, when used, is configured to flex rearward (FIG. 3A) of the carrier flag 15 from a rest position (FIG. 3B) aligned with the carrier flag 15 so that when the key blank 6, 8 is fed into the key blank recess 10 through the key blank channel 16, 18, the retaining clip 22 flexes rearward to allow the key blank 6, 8 to pass into the key blank channel 16, 18 and return back to its rest position when the key blank 6, 8 head has passed. In the rest position, the retaining clip 22 secures the key blank 6, 8 into the key blank recess 10 when the key blank is in a fully inserted position in the recess (FIGS. 2A and 2B). Reference numbers and/or letters 24 may be included on the key blank carrier 2, 4 to indicate the key blank packaged in the carrier or the key blank for which the carrier was configured. A dispensing or display aperture 26 may be included at or near an edge of the carrier flag 15. Use of a reentrant opening aperture 26 such as that illustrated in FIGS. 2A and 2B provides particular advantage with a rigid dispensing system support developed herewith but disclosed in more detail in a separate application.

The tip end 28 of the key blank carrier 2, 4 comprises at least a portion of the key blank recess 10 embodied as a key blank sleeve 28. The key blank recess 10 comprises at least two walls 32, 34, 36, 38 (FIG. 3C) that when a key blank 6, 8 is inserted into the recess 10 contacts at least two sides of the key blank 6, 8. For the embodiments illustrated in FIGS. 2A and 2B, the key blank recess 10 embodied as a key blank sleeve 28 contacts at least two sides of the key blank 6, 8 blade. The overall key blank carrier 2, 4 comprises a depth CD. Because in many cases the carrier is designed to be disposable and/or sold with the particular key blank which it holds, and because the carrier itself does not require any additional clamps or moving parts, it can be made small. In a particular implementation, the carrier width CWh1, CWh2 is not more than 3 inches at the carrier flag, the carrier width CWt1, CWt2 is not more, than 3/4 inch at the sleeve, the carrier depth CD is not more than 1/2 inch and the carrier length CL1, CL2 is not more than 4 inches. Particular embodiments, of course, are adapted to specific key models and will be configured relative to their respective sizes. Thus, smaller key blank carriers are likely and contemplated, In a particular embodiment, a key blank carrier has a carrier width CWh1, CWh2 of approximately 2 inches at the carrier flag and a carrier width CWt1, CWt2 of approximately 1/2 inch at the sleeve, approximately 3/8 inch carrier depth CD and approximately a 3 inch carrier length CL1, CL2.

The key blank carrier walls 32, 34, 36, 38 each comprise a thickness of 3/8 inch or less, and in particular embodiments, a thickness of ¼ inch or less so that the key blank carrier walls 32, 34, 36, 38 do not extend a significant distance from the key blank in relation to the thickness of the key blank. The inside of the key blank recess is configured and adapted to closely hold the particular key blank 6, 8 for which the corresponding carrier 2, 4 is designed. This may be accomplished in many different ways, but one particular way is to include one or more ridges 35 in at least a portion of the key blank carrier sleeve 12 to mate with a keyway (groove in the key blade) of the key blank. Although it is not necessary to match the shape of the particular key blank 6, 8, it is desirable in particular embodiments to snugly hold the particular key blank 6, 8 so that the particular key blank 6, 8 does not freely move within the recess. The carrier 2, 4 ultimately is inserted into a key cutter adapted to engage the carrier 2, 4 which positions the key blank blade for accurate cutting by the key blank cutter. If the key blank 6, 8 is not positionally secured within the carrier 2, 4 when the carrier 2, 4 is inserted into the key blank cutter, the key blank may not be accurately positioned by the key blank carrier 2, 4 or accurately cut by the key blank cutter. In other particular implementations, the key blank recess may comprise the key head channel with or without a key blade sleeve. The key blank carrier 2, 4 may be a disposable plastic carrier which is used for one or more of displaying the key blank on a display or in a vending machine, dispensing the key blank from a vending machine, verifying that the selected key blank is correctly selected, positioning and holding the key blank in the key blank cutter, and bearing the check-out code 52 (such as a bar code or alphanumeric code) (FIG. 3D) with which the user can pay for the key blank.

In particular implementations of a key vending system, the vending system may dispense a separate key blank carrier that is not mated with the key blank when dispensing the key blank. The user may be instructed to insert the key blank into the carrier before inserting the carrier and key blank into a key blank cutter. A key blank carrier, whether dispensed separately or previously incorporated with the key blank, may comprise a sleeve and/or a head cap or other alignment fixture that removably couples to the key blank. In particular implementations, ridges on an inside surface of the key blank carrier may be positioned and configured to engage grooves on the key blade to more securely hold the key blank within the carrier.

In particular embodiments of a key blank sleeve 10, a portion of the walls 32, 34, 36, 38 may be removed or recessed to expose all or a portion of the key blade for cutting through an aperture in a carrier wall, which aperture may be configured as a recess on a side of at least one of the carrier walls as illustrated in FIGS. 2A, 2B. In other particular embodiments, however, the key blade may not be exposed and the key may be cut through the carrier 2, 4. The walls 32, 34, 36 and 38 of the embodiment of FIGS. 2A, 2B and 3C comprise a key blade bit side wall 32 (corresponding to a side of the key blank blade into which the key bit pattern is cut), key blade spine side wall 34 (corresponding to a side of the key blank blade called the spine), a front side wall 36 and a back side wall 38. In the embodiment of FIGS. 2A and 2B, the portion of at least the front and bit sides is missing or recessed between the head end 30 and a distal end 40 of the tip end 28 that exposes a majority of a bit edge 7, 9 of the key blank 6, 8 when the key blank 6, 8 is in its fully inserted position in the key blank carrier 2, 4 (FIGS. 2A and 2B).

Standard carrier features and characteristics may be included on a plurality of carriers designed for a variety of key blank makes and models. For example, although the characteristics of the key blank recess will be different for different key blanks to receive and hold the key blanks, external characteristics of the carriers may be made the same so that the carriers all interact with a standard key blank cutter aperture to receive and position the key blank blades of all key blanks within an appropriately configured carrier in a correct location in relation to a cutting wheel of the cutter. Variations in key blanks require that for an accurate cut, the key blank must be positioned accurately within a three-dimensional space adjacent to the cutting wheel. By adapting relative carrier dimensions, all key blanks may be accurately positioned by a corresponding appropriately configured carrier in a key blank cutter. There are many variations possible for each key blank make and model depending upon the particular key blank cutter and key blank cutter aperture used. The examples provided in this disclosure are intended to be representative for purposes of communicating the idea but not limiting as to the limits of the possible variations. Those of ordinary skill in the art will readily understand from this disclosure the appropriate adjustments to be made for particular embodiments given the various parameters of a particular system and key blank.

Figure 3C:
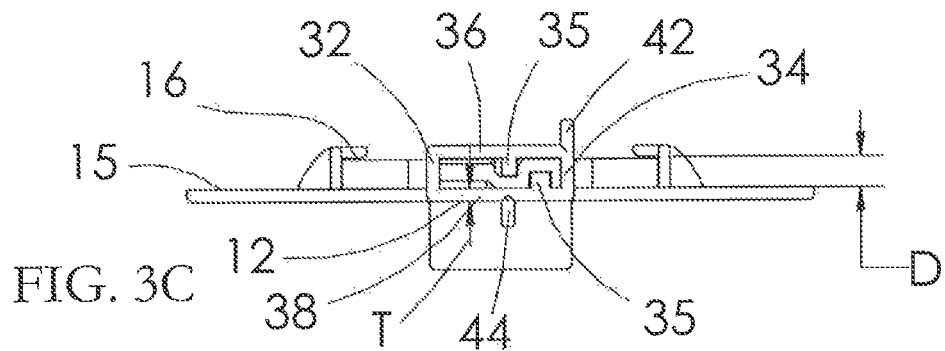
FIG. 3C is a tip end view of the retaining clip of FIG. 3A.

In a particular key blank carrier embodiment, the key blank recess may be positioned more toward the spine side 34 or to the bit side 32, more toward the front side 36 or toward the back side 38 (in any implementation or embodiment, whether configured as a key blank blade sleeve or simply as a key head recess), and may be positioned more toward the distal end 40 or toward the head end 30 of the carrier (relationally speaking to enable the key blade to be positioned farther or less into the cutter). On an outer surface of the carrier 2, 4, a key blank cutter alignment feature may be included. Although the embodiments of FIGS. 2A, 2B and 3C illustrate ridges 42, 44, other key blank cutter alignment features may be used such as, by non-limiting example, ridges, grooves, shaped cutter cross-sections, clips and the like to mate with a correspondingly shaped portion of the key blank cutter aperture to properly align the key blank carrier within the cutter for accurately cutting the particular key blank for which the key blank carrier was designed.

A particular implementation of an alignment feature may comprise a first ridge 42 on an outer surface of the sleeve 12, 14 extending lengthwise along a portion of the sleeve 12, 14. In the particular embodiment of FIGS. 2A, 2B and 3C, the first ridge 42 extends along a border of the key blade sleeve 12, 14 adjacent the key blank spine side 34. Inclusion of the ridge along the border adjacent the spine side 34 allows for stable support for the ridge 42 while allowing the front side 36 of the sleeve 12, 14 to flex enough for a key blank clamp of a key blank cutting system to clamp the key blank carrier 2, 4 with sufficient force to flex the carrier 2, 4 outer surface of the sleeve 12, 14 toward the key blank 6, 8, causing the sleeve 12, 14 to more securely grip the key blank 6, 8 within the sleeve 12, 14 through the carrier 2, 4 prior to cutting. Other embodiments may include a ridge in other locations on the sleeve 12, 14 or head flag 15.

Inclusion of a ridge 42 on the front side 36 of the sleeve 12, 14 creates an asymmetrical shape for an end view of the tip end 28 of the sleeve 12, 14 that inserts into a key blank cutter. The end view of the tip end 28 for particular embodiments may be made unique enough to allow insertion of the tip end 28 in only one orientation, that unique shape being asymmetrical for all but not more than one cross-section of the shape. Having a shape that is asymmetrical for all but not more than one cross-section of the shape ensures that the insertion orientation of the key blank carrier is always known. For a single-side cut key, the key blank bit side should be properly oriented in a key blank cutter so that the key blank bit side is oriented toward the cutting wheel. If it is improperly oriented, the key blank spine side will be cut. For double-side cut keys, such as some automobile keys for example, both sides of the key may be cut with mirrored patterns. In this case, it is not important to cutting the key blank whether a first or a second key blade edge is facing the cutting wheel, but only that it is correctly positioned within the key blank cutter aperture in relation to the cutting wheel and oriented correctly in relation to the wheel with the first or second key blade edge facing the wheel. Nevertheless, it may be important which edge of the key blank carrier is facing up or down for implementations involving an identifying bar code sticker (FIG. 3D), to permit the bar code to be scanned. In particular embodiments, such as that illustrated in FIG. 3C, a second ridge 44 may be included on a second side, such as the back side 38, of the sleeve 12, 14 to further assist in alignment.

In particular embodiments of the implementation illustrated in FIGS. 2A and 2B, an aperture or slit 48 may be included in a front 36 or back 38 side of the sleeve 12, 14. In the particular embodiment illustrated in FIGS. 2A and 2B, the slit 48 is included along a border of the bit side 32 of the carrier 2, 4 sleeve 12, 14. Addition of the slit 48 immediately adjacent to the bit side 32 of the sleeve 12, 14 provides two key advantages. First, the slit allows the front side 36 of the sleeve 12, 14 to be less rigid and to flex when a key blank cutter clamp presses against the outer surface of the sleeve 12, 14. This further enables secure holding of the key blank in the cutter during cutting of the key blank 6, 8. Second, the slit 48 positioned immediately adjacent to the bit side 32 of the sleeve 12 permits the bit side 32 of the sleeve 12 to flex outward slightly away from the bit edge of the key blank blade when a key blank 6, 8 is inserted into the sleeve 12. By making an internal dimension of the sleeve 12 slightly less or exactly the same as the key blank 6 for which the sleeve 12 is designed, ignoring tolerance variations, the key blank 6 bit edge can contact the bit side wall 32. Even if manufacturing tolerances are off for the particular key blank 6 or the carrier 4, the carrier 4 can adjust to the width of the key blade and still cause the carrier to press the key blade against the spine side wall 34 of the sleeve 12.

In some implementations, the distal end 40 of the carrier 2, 4, may be made a known length from where a shoulder 50 of the key blank 6, 8 will sit in the carrier 2, 4 for the particular key blank 6, 8 so that the key blank cutter can sense that the key blank has been fully inserted into the cutter and is ready to be clamped for cutting. In some embodiments, such as those illustrated in FIGS. 2A and 2B, the known length may be longer than the key blade for the particular key blank for which the carrier 2, 4 is designed. By establishing the relative dimensions of the carrier 2, 4 in relation to the particular key blank for which the carrier 2, 4 is designed, the relative positioning of the key blank shoulder 50 can be accurately known for accurate positioning in the cutter and accurate key blank cutting of the key bit pattern in relation to the key blank shoulder 50.

In particular embodiments, a leading edge of the ridge 42 may be tapered toward the outer surface of the sleeve 12, 14 as the ridge 42 nears the distal end 40 of the key sleeve 12, 14. Tapering toward the outer surface allows the shape of the end view of the sleeve 12, 14 to more easily insert into a mating shape on the key cutter. Additionally, in particular embodiments, a divot 46 (FIGS. 3B and 3C) may be included in one or more ridges 42, 44 on the key sleeve 12, 14. Inclusion of a divot 46 allows for a reference point on the key sleeve that can be used by a key blank cutter to engage the key blank carrier 24 (see FIG. 5D and related discussion). For the rounded divot illustrated in FIGS. 3B and 3C, the divot 46 in the carrier 2, 4 is positioned to engage a spring biased clip in the cutter when a user inserts the carrier 2, 4 into the cutter and gives the user a tactile response to know that the carrier 2, 4 is fully inserted. Although the example illustrated in FIGS. 3B and 3C include the divot 46 in one or more ridges 42, 44, a similarly functioning reference point on the carrier 2, 4 may be made at other places on the carrier 2, 4 in other embodiments and implementations. In other particular implementations, the distal end 40 of the sleeve 12, 14 may have one or more tapered outer surfaces to simplify insertion of the sleeve 12, 14 into an aperture on the key blank cutter.

Particular implementations of a carrier, such as that illustrated in FIGS. 2A and 2B, may comprise a reference indicator on the carrier 2, 4 indicating to the user which side is up and in which direction the user should insert the carrier 2, 4 into a key blank cutter. In particular embodiments, the reference indicator 56 may comprise an arrow placed on the sleeve 12, 14. In more particular embodiments, the reference indicator 56 may be an aperture through the front side wall 36 of the sleeve. Although other physical attributes of the key blank carrier may be configured to physically require the key blank to be inserted in a particular orientation, a visual indicator that is physically part of the key blank carrier, not just a sticker adhered to the carrier that may fall off, may help the user in using the key cutting system. Whether used as an indication to the user or not, a reference indicator such as an aperture through a wall of the sleeve 12, 14 or other reference indicator on the carrier 2, 4 may be included on the carrier 2, 4 that functions as a reference point for the key blank cutter to ensure the key blank carrier 2, 4 is fully inserted into the key blank cutter. This may be confirmed through the portion of the key blank carrier 2, 4 in many different ways, such as, without limitation, engaging a switch within the cutter, blocking a light beam, or allowing a light beam.

Figure 3D:
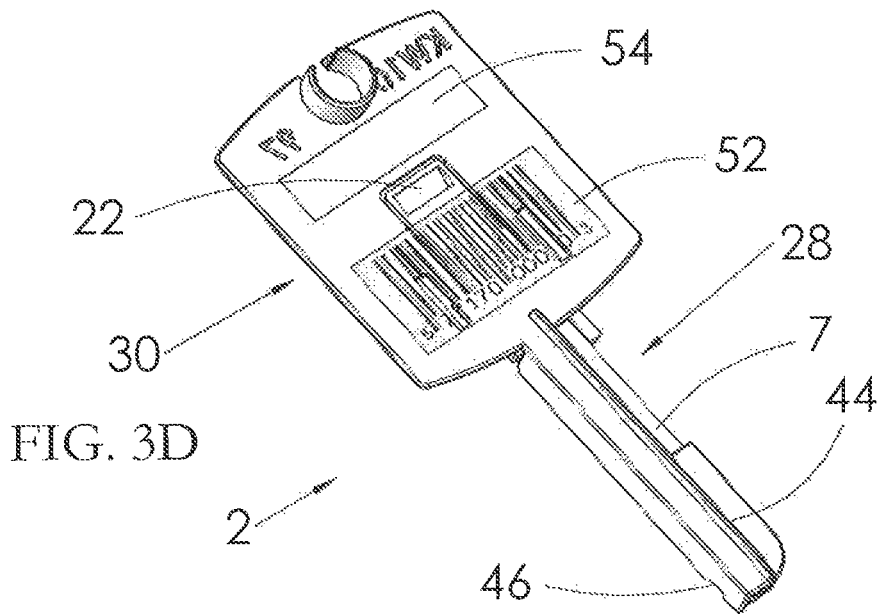
FIG. 3D is a back side view of the retaining clip of FIG. 3D.

Particular implementations of a carrier, such as that illustrated by FIG. 3D, may further comprise one or more bar code stickers 52 and/or other machine readable identifier, such as a radio frequency identification (RFID) tag 54 on the carrier, to assist in inventory tracking, security, product verification and checkout. For example, inclusion of a bar code sticker 52 on a back surface of the carrier 2, 4 of FIG. 2A or 2B over the retaining clip 22 may be used to restrict flexing of the retaining clip to further restrict key blank removal from the carrier 2 without damaging the sticker 52. The bar code on the sticker 52 may also be used by the key blank cutter to confirm that the particular key blank being cut is an appropriate key blank for the master key identified by the system. The bar code on the sticker 52 may also be used for product checkout at a cash register to allow the user to pay for the duplicate key after it is cut. An RFID tag 54 may be used for any of these uses as well, but also has an advantage of being trackable from a distance. Particular implementations comprise an RFID tag on or in the carrier, and in particular embodiments, the RFID tag is included on or in the key sleeve.

As will be clear to those of skill in the art, the various features illustrated in reference to the various embodiments and implementations, even if not specifically discussed with reference to a particular embodiment or implementation may be included in any embodiment or implementation depending upon the needs of a particular application of the technology. The differing examples provided herein are not intended to be limiting of particular features to particular examples.

Figure 4:
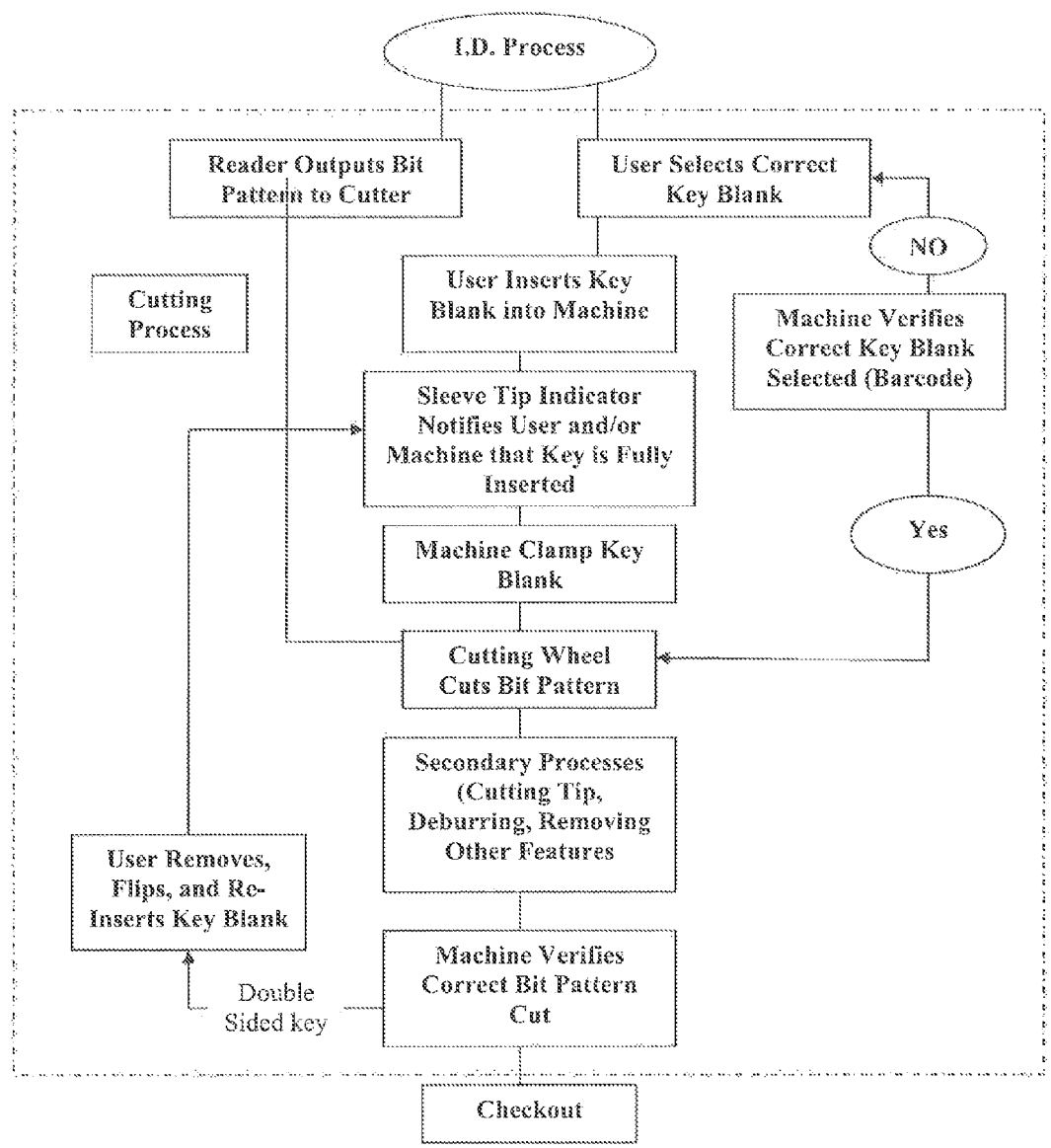
FIG. 4 is a block diagram of a specific key cutting process embodiment.

FIG. 4 illustrates an example of a detailed cutting process. In FIG. 4, a bit pattern reading device outputs the master key bit pattern to the key blank cutter. The reading device may send the bit pattern to the cutting portion through electrical signals, mechanical movements, or other information transfer methods. The identification process may output the key blank type to the user, may simply dispense a correctly configured key blank or may allow the user to select from a variety of correctly configured key blanks to match the identified master key. Particular embodiments of the output may be in the form of a color code, an alphanumeric code, or other identifiable method so the user may select the correct key blank from the matching code on the carrier. In a particular implementation, the key blanks may be stored in a rack or dispensing machine. The user may select the key blank and then insert the key blank into the machine. Upon insertion of the key blank and carrier into the key cutter, a reference indicator, such as on a key blade sleeve tip or key blade head clip indicates that the key blank and carrier are fully inserted into the cutter.

At any point of the cutting process, the key blank may be verified to ensure that the correct key blank was selected. The verification step may occur prior, during, or after insertion into the cutter. The step may occur automatically or the user may be prompted to complete this step. Particular embodiments may include a prompting to the user to scan the key sleeve in a barcode reader or the system automatically reading the key bar code or RFID tag code upon insertion by the user. If the key blank is wrong, the machine may prompt the user to select the correct key, disable the machining capabilities of the machine, or by another method inhibit the equivocal duplication of a key blank. The cutting portion of the key may clamp the key and the cutting wheel duplicates the bit pattern into the blade of the key blank. If the key is a double sided key, the machine may automatically flip the key, prompt the user to turn the key over, or by another method cut two sides of the key.

Figure 5A:
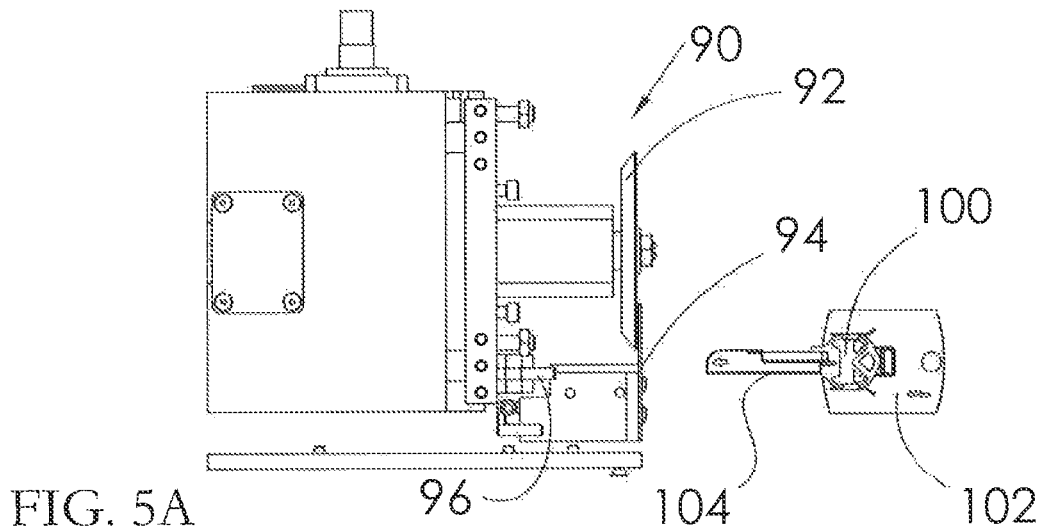
FIGS. 5A-5E are cut away views of a key blank cutter during a key blank cutting process.
Figure 5B:
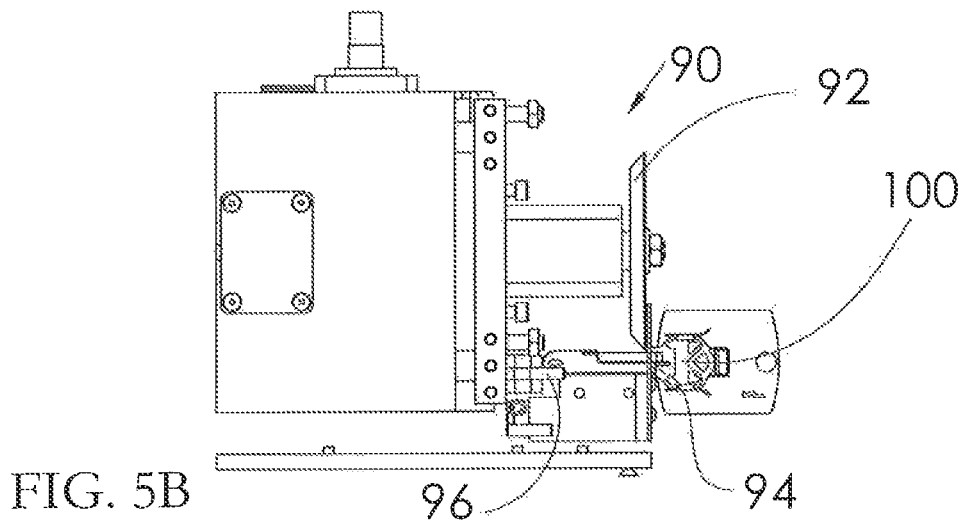
Figure 5C:
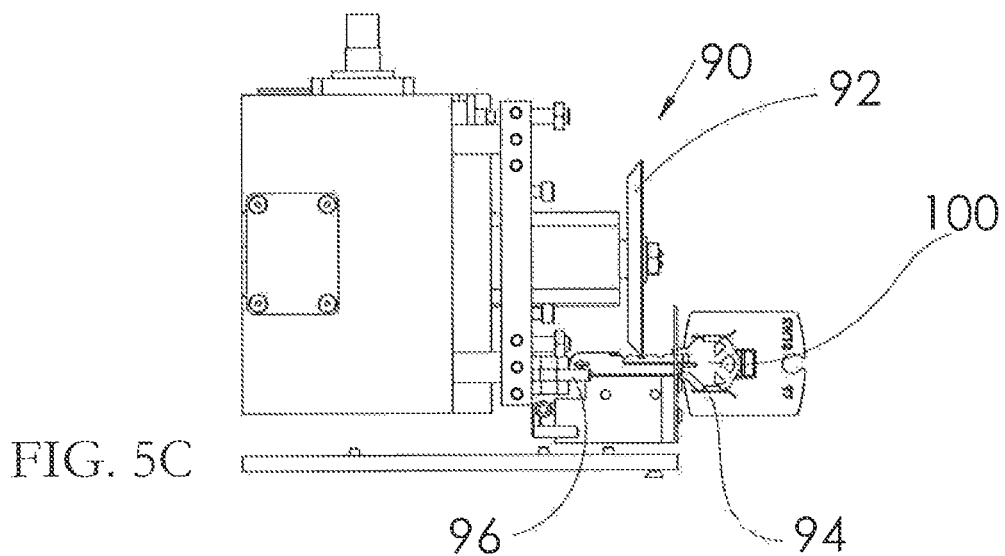
Figure 5D:
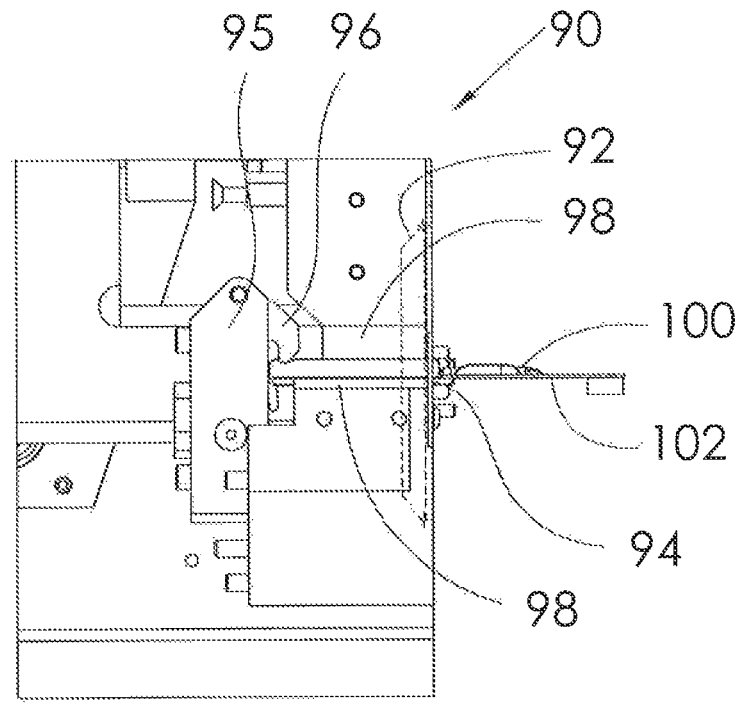
Figure 5E:
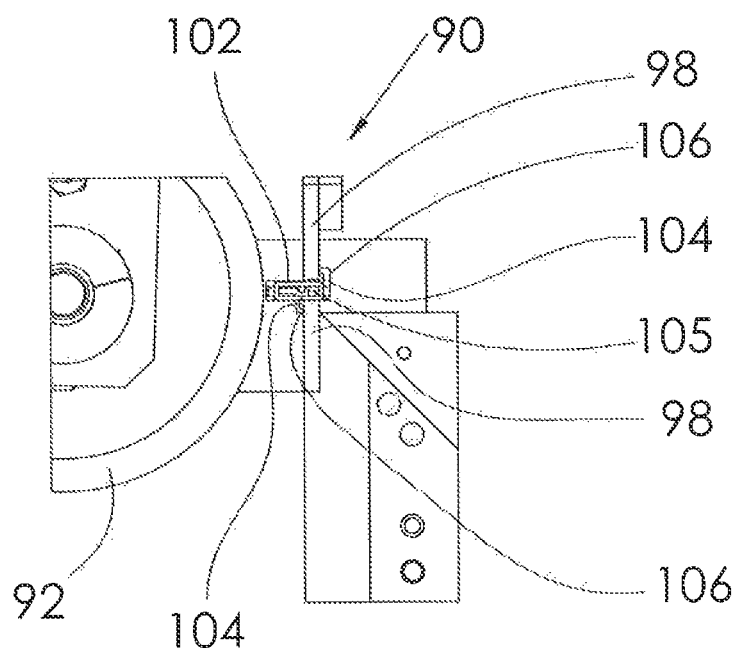

The following is an abbreviated description of an example of a key cutting operation using a key carrier. FIGS. 5A-5E illustrate various cross-sectional views of an example of a key blank cutter 90 with a cutting wheel 92, the key blank cutter 90 adapted for cutting a key blank 100 in a key blank carrier 102 embodied as a key sleeve. FIGS. 5A-5C illustrate a top down cross-sectional view of the cutter 90 with the key blank 100 in its carrier 102. FIG. 5A illustrates the key blank 100 in its carrier upon removal from the cutter 90. The cutting wheel 92 may be disengaged and the key entry 94 opened prior to insertion of the carrier 102. One or more alignment features 104 on the carrier 102 and a tip end view shape of the carrier 102 (see FIG. 5E) ensure that the key blank 100 is properly positioned within the cutter 90 in relation to the cutting wheel 92 including that the key blade bit edge is facing toward the cutting wheel 92 (FIG. 5B). When the key blank carrier 102 of this embodiment is fully inserted, a carrier tip sensor 96 senses that the carrier 102 is fully inserted and the carrier 102 and key blank 100 are clamped in place. After one or more carrier 102 and/or key blank clamps 98 (FIG. 5D) are engaged, the cutting wheel 92 contacts the key blade (see FIG. 5C) to duplicate the appropriate bit pattern as determined by the identification process. FIG. 5D illustrates a side cross-sectional view of the embodiment of FIG. 5A, illustrating clamps extending along a length of the key blank 100 blade. In the embodiment illustrated, the tip sensor 96 is embodied as a hook shaped cam that interfaces with a sensor contained in the cam housing 95 and a divot 106 in the key blank carrier. The one or more clamps press at least a portion of the key blank blade, and thereby may immobilize the key blank during cutting. FIG. 5E illustrates a cross-sectional sleeve distal end view of the clamp 98 and key blank blade 105 which is orthogonal to the view of FIG. 5D. In this view, the one or more alignment features 104 on the carrier 102 are shown to interface with corresponding features 106 on the carrier aperture and in this embodiment even with the one or more clamps 98 themselves. Interface between the one or more alignment features 104 and corresponding features on the one or more clamps 98 themselves further provides stability for the key blank 100 and its carrier 102 during cutting. The one or more clamps 98 may or may not directly contact the key blank blade 105 during the cutting process and may clamp the key blank 100 through the carrier 102 or through a combination of direct contact with the key blank 100 and through the carrier 102.

In particular implementations, after any portion of the cutting process, secondary processes may be employed to further prepare the key for use, such as removing extra features from the key such as extended tips, knobs, or ridges. The key may also be deburred by passing the cutting wheel across the key bits a second time to clean them up and smooth them out. At any point after cutting the key bit pattern into the key blank 100, the key duplication system may have a verification method for determining if the now duplicated key matches the master key. The verification may occur within the cutting area of the cutter, or in a separate location.

Figure 6:
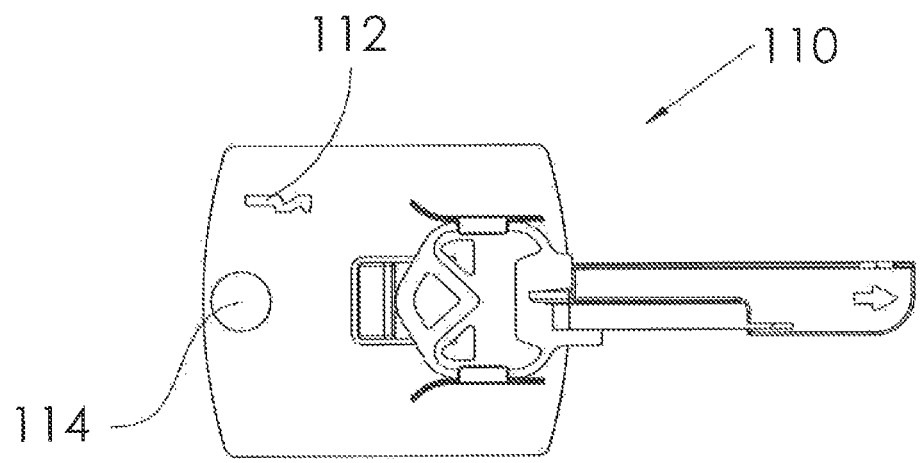
FIG. 6 is a front view of a key blank carrier illustrating additional features.

FIG. 6 illustrates another embodiment of a carrier 110 comprising many of the similar features to the particular embodiments described with reference to FIGS. 2 and 3 and description of those Figures should apply to the particular embodiment of FIG. 6 with the exception of the two elements discussed here. In the particular embodiment of FIG. 6, though the feature may be included in any other embodiments as well, an aperture 112 is included through the substantially planar key head surface that is sized and shaped to mate with the cross-sectional profile of the master key matching the key blank for which the carrier is designed. Inclusion of a mating aperture similar to a lock keyway opening, allows the user to further confirm that the key blank the user is about to cut for the master key matches the master key. A display aperture 114 is also included, similar to the display aperture 26 of FIGS. 2A and 2B, but in this case the display aperture 114 is not a reentrant opening aperture. Instead, it is simply an aperture that permits a display rod to be inserted there through for displaying the product prior to sale. Either aperture type may be used on any of the embodiments disclosed herein depending upon the needs of a particular product display or vending unit.

FIGS. 7A and 7B illustrate, respectively, another embodiment of a key blank recess implemented as a key blank blade sleeve. FIG. 7A shows a perspective view of a front side of each of two key blanks 116, 118 from different manufacturers within key blank carriers 120, 122 designed for those specific key blanks, and FIG. 7B shows a perspective view of a back side of the key blanks 116, 118 within the key blank carriers 120, 122. Many of the same features discussed in relation to the carriers and key blanks discussed in relation to FIGS. 2 and 3 are shown in the embodiments of FIGS. 7A and 7B, such as but not limited to, alignment features 130 on the key blank carriers 120, 122, key blank recesses embodied as sleeves, apertures through the sleeves, substantially planar portion extending toward the key head, bar code sticker on the back side of the substantially planar portion, and the like. Additionally, however, there are features not previously illustrated in other embodiments that are illustrated here. Other embodiments discussed in this disclosure may include any of these additional features in addition to or instead of some of the features included on those other embodiments. In particular embodiments, a security feature 124, in FIGS. 7A and 7B embodied as a retaining clip 124, may be included on the carrier to physically engage with a corresponding feature on the key blank 116, 118. The retaining clip 124 allows the key blank to be inserted into the carrier sleeve, but once the clip engages with an additional notch 126, cut out from a side of the key blank 116, 118, the key blank is locked into the carrier to restrict its withdrawal until the retaining clip 124 is cut, broken, bent or released to release the key. Key blanks typically do not have notches cut out from above the shoulder of the key blank. However, a notch between the shoulder of the key blank and the key blank head may be used to engage the key blank within the key blank carrier. In particular cutting methods, the security clip may be cut by the cutting wheel prior to the cutter releasing the key blank carrier to release the cut key blank from the key blank carrier. In other particular methods, the user bends or breaks off the clip to remove the key from the carrier. The additional security feature may additionally or alternatively include retaining clips that interface with any portion of the key blank blade, rivets, rings, plastic loops, ties, tabs, glue, other adhesives, and other securing methods. These devices may be removed by a variety of methods including mechanically releasing the key, cutting, breaking, or bending the security feature, dissolving, or any other process appropriate to remove the security feature. The security features may be incorporated by primary manufacturing processes for they key blank such as, but not limited to, casting, pressing, or punching, or by secondary manufacturing processes such as milling, cutting, press fitting, plastic press molding, and so on.

FIGS. 8A and 8B illustrate front and back perspective views of another embodiment of a key blank carrier 127 comprising a large carrier flag 128, a retaining clip 124, and alignment features 130 with divots 132. A portion of the key blank sleeve is recessed to reveal a portion of the key blank blade 134 for cutting.

Figures 9A, 9B:
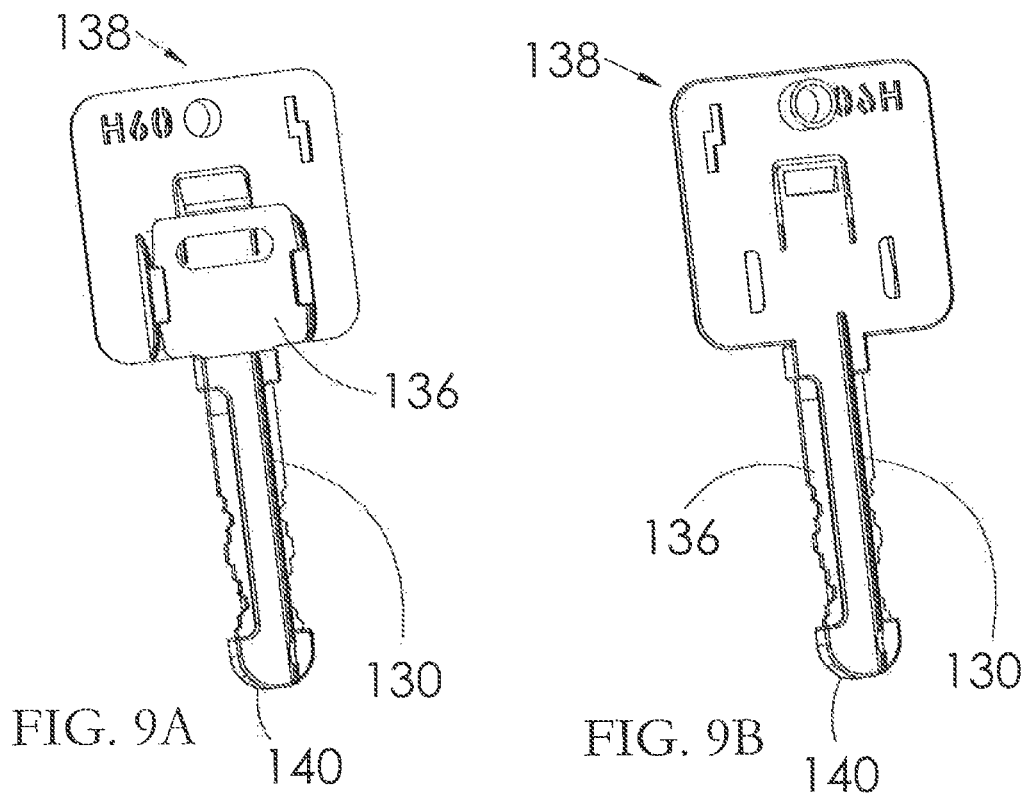
FIGS. 9A and 9B are front and back side views of key blank carriers for two different key models illustrating a portion of the key blade sleeve removed in combination with a key blank security feature and a key blank head channel.
Figure 9C:
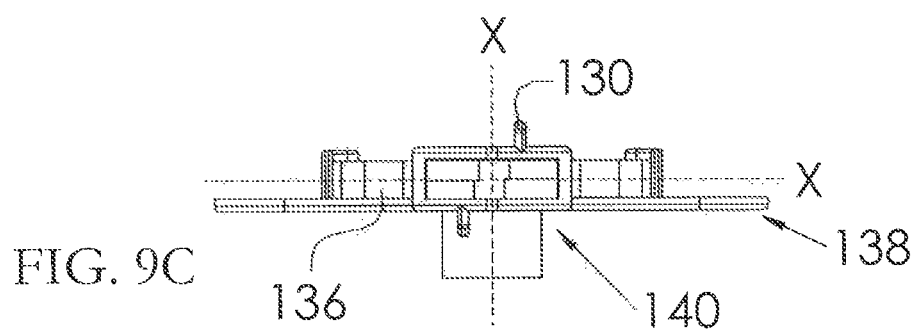
FIG. 9C are distal tip end views of the key blank carriers of FIG. 9A.
Figure 9D:
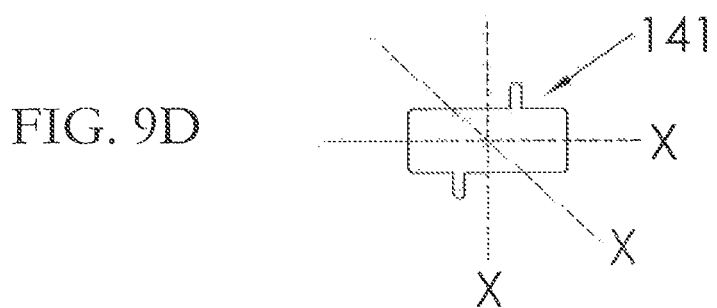
FIG. 9D is a representation of a shape formed by the end view of the distal end tip view footprint caused by from the sleeve tip and alignment ridges.

FIGS. 9A and 9B illustrate front and back perspective views of a key blank carrier for a double-sided key 136. This embodiment is configured similar to the embodiment of FIGS. 2 and 3, but the carrier 138 includes openings along both edges of the key blank blade to correspond to the edges of the key blank blade that need to be cut in the cutter. The carrier 138 includes a tapered distal end 140 and appropriately configured and positioned alignment features 130. FIG. 9C illustrates a distal tip end view of the key blank carrier of the embodiment of FIGS. 9A and 9B. Note that an end view of the walls of the sleeve in combination with the key blank alignment features 130 form a shape 141 that is asymmetrical about all cross-sectional axes X (see FIG. 9D). FIGS. 10A and 10B are distal tip end views of two additional key blank carriers illustrating different distal tip end view shapes. The example of FIG. 10A is asymmetrical for all cross-sections, but the example of FIG. 10B is asymmetrical for all but one cross-section (down the middle). By using an end view with a carrier insertion shape (the part that inserts into a cutter) that is asymmetrical about all but one cross-section of the shape, the user can be assured to insert the carrier in a known orientation for cutting the key blank. For single sided keys (FIG. 10A), this is important because a single sided key inserted backward will be cut with the bits on the spine of the key blank resulting in a non-functional duplicate key. For double sided keys (see FIG. 9C), the alignment features 130 may be positioned equidistant from a center axis on opposing front and back sides of the carrier 138 so that the carrier 138 can be removed and rotated 180 degrees if only a single cutting wheel is used in the cutter and manual rotation is required for a particular implementation of a cutter.

A non-limiting example of a standard alignment feature for multiple single and double sided carriers to interface with a single cutter key blank aperture may comprise an aperture that has three grooves; two on the top and one on the bottom of the aperture opening. A single sided key sleeve may have three corresponding ridges, whereas a double sided key sleeve may have two ridges (one on top and one on bottom) such that the key sleeve may be flipped and inserted into the same aperture. Another example may be a hole with two grooves on one side that mates with a carrier that has one or two ridges on the corresponding side, thus allowing the sleeve to be inserted in only one orientation. Other configurations may employ any combination of alignment features, some of which may allow for a distinction between key blank sleeve types.

FIGS. 11A and 11B illustrate front and back plan views of a key blank carrier embodiment with a differently shaped flag 142 and a tapered distal end 140 of the key blank carrier. Each implementation of a key blank carrier disclosed herein may comprise only one or all of the various features discussed in relation to the other implementations and embodiments of key blank carriers, and the examples provided herein involving combinations of features is not intended to be limiting of which features may be used together in a particular embodiment.

Figure 12:
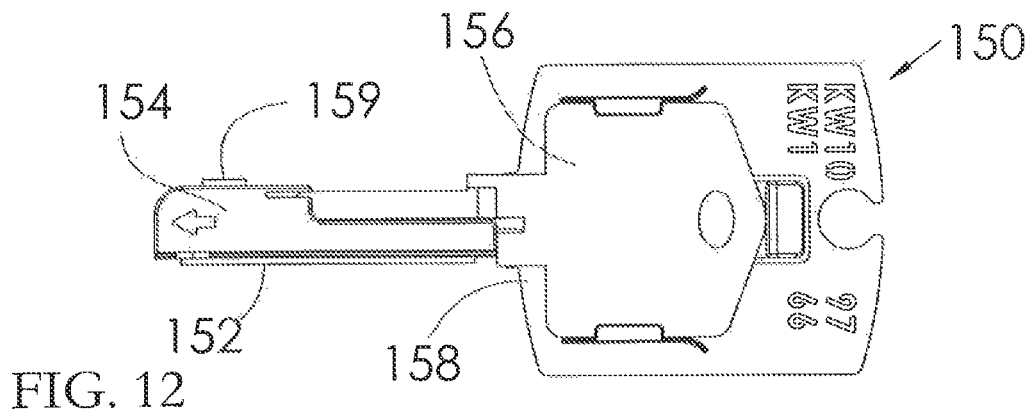
FIG. 12 is a front perspective view of a key blank carrier comprising a hinged front side.

FIG. 12 illustrates a particular implementation of a key blank carrier 150 comprising a hinge 152 along a first side that allows a front side 154 of the key blank carrier 150 to be hinged open for insertion of a key blank 156 into the key blank recess of the carrier 150. The hinge may be configured as a living hinge formed in a single molding process with the remainder of the carrier, or may be formed with a first portion of the hinge on a carrier base 158 and a second portion of the hinge on the front side 154 of the carrier 150, wherein the front side hinge portion and the base side hinge portion mate to form the hinge. The hinge may hinge near the tip of the key, the head of the key, along a side of the key as illustrated in FIG. 12, or near any other location. A closing latch 159 may also be included at any number of possible locations to assist in holding the front side 154 closed against the carrier base 158. Particular implementations may not include a closing latch 159 at all, and other particular implementations, such as illustrated in FIG. 13, may not include a top side of the key blank carrier at all.

Figure 13:
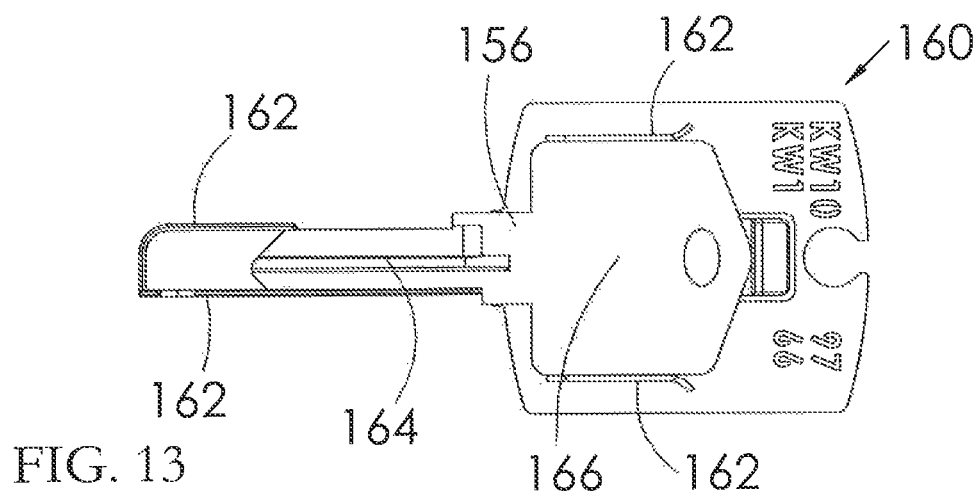
FIG. 13 is a front perspective view of a key blank carrier without a front side.
Figure 14:
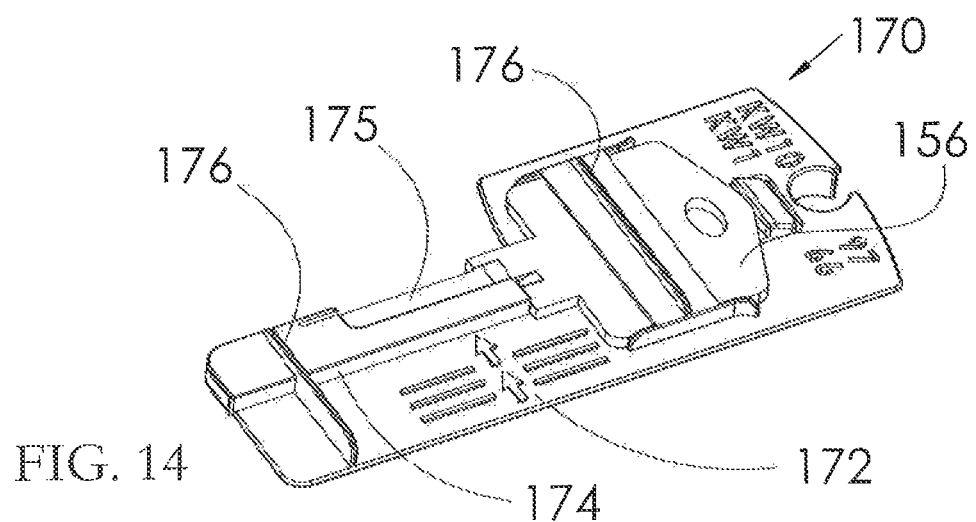
FIG. 14 is a front view of a side-mount key blank carrier.

For any of the implementations discussed in the present disclosure, but particularly for the implementations illustrated through the embodiments of FIGS. 12, 13 and 14, the key blank carrier may be configured as in FIG. 12 wherein a key blank carrier 160 comprises raised side wails 162 that restrict side movement of the key blank 156 within the carrier 160 around portions of the key blank blade 164 or the key blank head 166 or both. As with earlier implementations exposing the key blank blade for cutting, any implementation, but particularly for the implementations illustrated through the embodiments of FIGS. 12, 13 and 14, portions of raised side walls 162 may be removed near the key blade blank 164 to provide easier access by the cutting wheel of the key blank blade 164 for cutting, to remove the need to cut through the key blank carrier 160 to cut the key blank blade 164, and to avoid leaving the key bit pattern of the master key in the cut key carrier 160.

FIG. 14 is a perspective view of a key blank carrier 170 comprising a handle 172 extending from the spine side 174 of the key blank carrier 170. Use of a handle 172 extending from the spine side 174 of the key blank carrier 170 or elsewhere on the key blank carrier 170 allows for use of the key blank carrier 170 in a side-mount configuration where the key blank 156 is inserted into a key blank cutter sideways with the bit edge 175 of the key blank 156 facing the cutting wheel. Alignment features 176, embodied as ridges similar to previous implementations and embodiments or as any other embodiment discussed herein, may be included on the key blank carrier as with other embodiments, just oriented differently so that the unique shape for mating with an opening in the cutter is viewed in relation to a side of the carrier for key blank side insertion rather than for key blade tip insertion.

FIG. 15A illustrates a key blank 180 with an oversized key blank head 182 having a head depth HD greater than its blade 184 depth BD. FIGS. 15B-15G are front, right side, back, head end, tip end and close-up views of a key blank carrier 186 holding the key blank 180 of FIG. 15A. In this particular embodiment a locking notch 188 is cut into the key blank 180 between the key blank head 182 and the distal end 190 of the key blank blade 184. Non-limiting examples of a key blank 180 with an oversized key blank head 182 include a key blank 180 having a transponder within the key blank head 182, and a key blank 180 with a rubberized or plastic key blank head 182 or coating over a key blank head 182. Many automobiles and other security keys include transponders within the key head 182, resulting in a larger key head depth HD and overall size. In the embodiment illustrated in FIGS. 15A-15G, to adapt for a key blank head 182 with a depth HD greater than its blade 184 depth BD, a step 192 is added between the substantially planar key blank carrier flag 194 and a key blank sleeve 196. It will be understood by those of ordinary skill in the art and is specifically contemplated by this disclosure, that the additional feature of the step 192 between the key blank carrier flag 194 where the key blank carrier flag 194 is recessed back from the and the key blank sleeve 196 may be applied to any of the specific key blank carrier implementations and embodiments of FIGS. 2, 3, 6, 7, 8, 9, 10, 11, 12, 13 and 14, and the features of those other specific embodiments may be equally applied to the embodiment of FIG. 15. The respective descriptions of each of those embodiments and implementations should be treated as though they each include express additional embodiments illustrating the combination of this step feature and alternative or additional security feature into those descriptions.

The specific embodiment illustrated in FIGS. 15B-15G includes many other key blank carrier 186 features discussed previously in relation to other key blank carriers. Examples of some of these features include key blank alignment features 198, a tapered key blank carrier distal tip end 200, a substantially planar key blank carrier flag 194 at a head end, portions of the key blank 180 exposed through the carrier along the key blank blade 184, a bar code 202, an RFID tag 204, and a key blank retaining clip 206. In this particular embodiment of a key blank retaining clip 206, a release tab 208 extends from the flexible retaining clip 206 and back-and-forth movement of the release tab 208 causes corresponding movement of the retaining clip 206 into and out of the locking notch 188 on the key blank 186. In the particular embodiment of FIGS. 15B-15G, the release tab 208 extends along, adjacent and parallel to an edge of the key blank carrier flag 194, perpendicular to the retaining clip 206 that mechanically engages the key blank blade 184.

FIGS. 16A-16C illustrate, respectively, front, right side and perspective views of a key blank 210 in a key blank carrier 212 comprising a key blank recess 214 configured to receive a key blank head 216. Similar to key blank carrier embodiments previously discussed, the key blank carrier 212 of this embodiment comprises key blank carrier alignment features 218 adapted to interface with a front side of a key blank cutter. In the embodiment illustrated in FIGS. 16A-16C, a security feature is configured as a retaining clip 220 that flexes forward of the substantially planar key blank carrier flag 222 when a key blank head 216 is inserted into the key blank recess 214 and the retaining clip 220 inserts into and engages the key ring hole 221 of the key blank head 216. Similar to embodiments discussed herein comprising key blank recesses embodied at least in part as key blank blade sleeves, the key blank blade recess 214 of the embodiment illustrated in FIGS. 16A-16C is sized and configured to securely hold the key blank 210 in a known position in relation to the key blank carrier 212 so that when the key blank carrier 212 is mechanically engaged with a mechanically mating feature on a key blank cutter, the key blank blade 224 is accurately positioned for cutting the specific key blank blade 224 for which the key blank carrier 212 is designed. Also as with previous embodiments discussed involving a key blank blade sleeve, key blank carrier 212 implementations and embodiments may be adapted for different key blank models by resizing and shaping the key blank recess 214 to fit the size and shape characteristics of the different key blank models in a way that holds them securely when at least the key blank head 216 is inserted into the key blank recess 214 of the key blank carrier 212.

FIGS. 17A-17C illustrate, respectively, front, right side and perspective views of a key blank in a key blank carrier 226 comprising key blank recess 228 configured to receive a key blank head 216 and an extended key blank alignment feature 230 extending along a portion of the key blank blade 224, parallel to an insertion direction of the key blank blade 224 into a key blank cutter. For this particular implementation, the key blank alignment feature 230 is an extension of the key blank carrier 226 substantially planar portion 232 that directly contacts the key blank head 216. The key blank alignment feature 230 extends along the key blade 224 and includes a ridge 234 similar to that included in previous embodiments and an optional divot 236 on the ridge 234 similar to previous embodiments. In some implementations, the key blank carrier 226 portion adjacent the key blank head 216 may be made very small such that includes roughly a key blank carrier flag with a retaining clip and key blank channel. An alignment feature like that of FIGS. 17A-17C could then be used and materials (namely plastic) usage could be kept to a minimum. Alignment features 230 are not required on the key blank carrier 226 near the key blank head 216.

Other features such as the reentrant opening on the key blank carrier flag, a mating key blank cross-section aperture on the flag, a divot on a portion of the alignment feature to give the user a tactile response indication that the key blank carrier is fully inserted and tapered edges to the leading edges of the alignment features may be included on the key blank carrier as discussed in relation to previous embodiments in addition to the features discussed in relation to the embodiments of FIGS. 16 and 17.

FIGS. 18A-18C illustrate, respectively, front, right side and perspective views of a key blank 240 adapted to include at least one alignment feature 242 on the key head 244 to assist in aligning the key blank 240 in a key blank cutter. By presenting any of ridges, knobs, ramps and the like as alignment features 242 on the key blank head 244, the key blank 240 itself may be configured to self-align in the key blank cutter when the key blank 240 is pushed into the cutter by a user. The combination of alignment features 242, 243, 245 similar to the principle applied with the alignment features on the key blank carrier, can not only ensure that the key blank 240 is inserted with the correct side of the key blade 246 facing the cutting wheel if needed, the depths FD of the alignment features and their left-to-right placement on the key blank 240 can ensure that the key blade 246, when fully inserted by a user, is properly positioned on both the X and Y axes for accurate cutting. The cutter may also be adapted with additional hardware to ensure that the key blank 240 is fully seated with the cutter interface by drawing the key blank into the cutter until it reaches a fully inserted position. For the embodiment of FIG. 18A, both horizontal and vertical alignment features 242, 243, 245 are included, the vertical alignment features 242 ensuring straight insertion and the horizontal alignment features 243 providing a stop for indicating full insertion in to the cutter. In the particular embodiment illustrated in FIG. 18B, a ramped alignment feature 245 is included on a back side of the key blank 240. The alignment features 242, 243, 245 on a key head 244, though unusual for typical key blanks, can also be designed to be decorative and ornamental in additional to having the functional purpose of ensuring proper alignment of the key blank 240 with the cutter so that the unusual alignment features are more readily accepted. In particular implementations, the alignment features may be incorporated into a design for an oversized key blank head such as that illustrated in FIG. 15.

FIGS. 19A-19C illustrate, respectively, front, right side and perspective views of a key blank 250 adapted to include an alignment feature 252 on the key blade tip 256 in addition to key head 258 alignment features 253, 254, 255 similar to the key head alignment features 242, 243, 245 of the embodiment shown in FIGS. 18A-18C. Once a key blank is correctly inserted into a key blank cutter and clamped in place, the alignment features are less important than during initial insertion, and in many cases are useless. Although the embodiment of the key blank illustrated in FIG. 19 would not work in a typical lock in this form, it is contemplated that as part of the key blank 250 cutting process that the key blank cutter would cut off the portion of the key blank distal end tip 256 that includes the alignment ridge 252. Inclusion of one or more additional alignment features 252 near a key blade tip 256 of a key blank 250 may reduce the number of alignment features 253, 254, 255 used on the key head 258 for particular implementations.

For the implementations of FIGS. 18 and 19 where an alignment feature is included on a key blank head, it should be understood that the head of the key blank, in being made ornamental with the alignment features or even in other embodiments comprising key blank carriers where it is desirable to allow for decorative key blanks, the key blanks may be customized with logos, graphics, or other markings, through processes such as laser engraving, printing, stamping, engraving, and other marking processes. In a particular implementation, the key head may be decorated with dome or other shape attached to the head of the key. The shape may include team logos, vanity inscriptions, or other personalized customizations. The customizations may include inlaid pictures, engraving, laser engraving, printing, other methods known, or any combination of these methods. In particular implementations, the key head may be customized before or after being cut.

Figure 20:
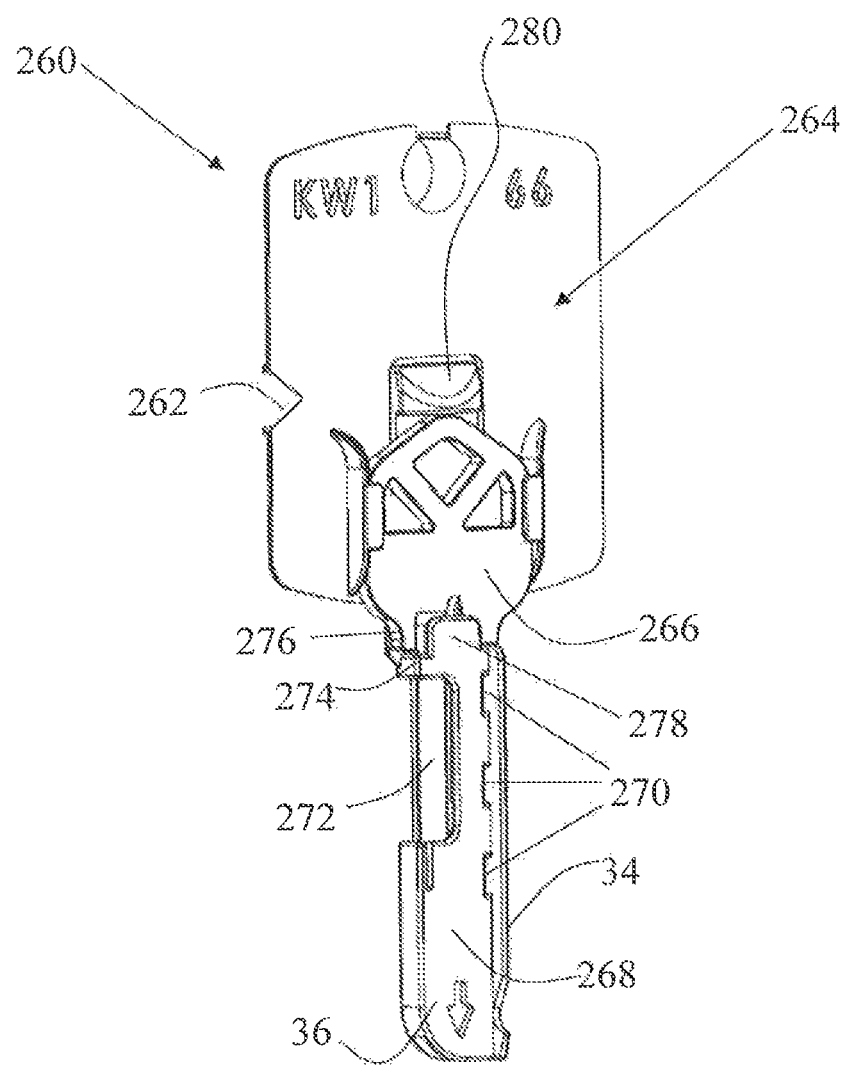
FIG. 20 is a front perspective view of a key blank carrier with a key blank burr removal opening.

FIG. 20 illustrates a particular implementation of a key blank carrier 260. In this particular implementation, the key blank carrier 260 comprises a key blank burr removal opening 262 on a side of a substantially planar surface 264. Key blank burr removal opening 262 may be V-shaped and may comprise a sharp, beveled edge. The key blank burr removal opening 262 is useful for removing burrs from a key after a key blank 266 is cut. After the key blank 266 and key blank carrier 260 are inserted into an opening in a key blank cutter and the key blank 266 is cut by a key blank cutting wheel, the cut key blank 266 and the key blank carrier 260 are removed from the key blank cutter. The cut key blank 266 is separated from the key blank carrier 260 and then a blade 272 of the cut key blank 266 is moved along the key blank burr removal opening 262 until at least one burr is removed from the cut key blank 266. Although in this particular implementation the key blank burr removal opening 262 is located on a side of the substantially planar surface 264 near the head of the key, in other implementations the key blank burr removal opening 262 may be located anywhere on the key blank carrier 260, on the key blank cutter or on a separate device. In a particular implementation, the key blank burr removal opening is located on a portion of the sleeve of the key blank carrier 260 near the key blade.

In this particular implementation the key blank sleeve 268 has three apertures 270 in the front side wall 36 adjacent the spine side wall 34. Although there are three apertures 270 illustrated in this particular implementation, in other implementations there may be one or more apertures 270. The apertures 270 may be useful in implementations of a key cutter that includes optics for identifying whether the key blank blade 272 is aligned properly with the spine side wall 34 by viewing the key blank blade 272 through the apertures 270. Furthermore, the apertures 270 allow the front side wall 36 to be more flexible when pressed by a clamp to clamp the key blank 266 more securely for cutting.

In the particular implementation shown in FIG. 20, the key blank sleeve 268 comprises a shoulder band 274 to more securely hold the key blank 266 in proper alignment with the key blank carrier 260. The shoulder band 274, and other features and aspects illustrated in FIGS. 20-23B are not limited to use only with these particular implementations and may be applied by those of ordinary skill in the art to any of the other implementations illustrated or described in association with this disclosure. By specific example, FIGS. 2B, 8A, 8B, 9A, 9B and 15B-15G all illustrate a shoulder band. The shoulder band 274 in the implementation illustrated in FIG. 20 surrounds a portion of the key blank blade 272 and is located adjacent to the shoulder 276 of the key blank 266. An extended tab 278 is adjacent to the shoulder band 274 on the front side wall 36 of the key sleeve 268 to prevent the key blank carrier 260 from being caught on the key blank cutter as it is removed from the key blank cutter. In the particular implementation illustrated, the flexible retaining clip 280 is contoured and flares out to assist in smooth insertion of the key blank 266 into the key blank carrier 260.

Figure 21:
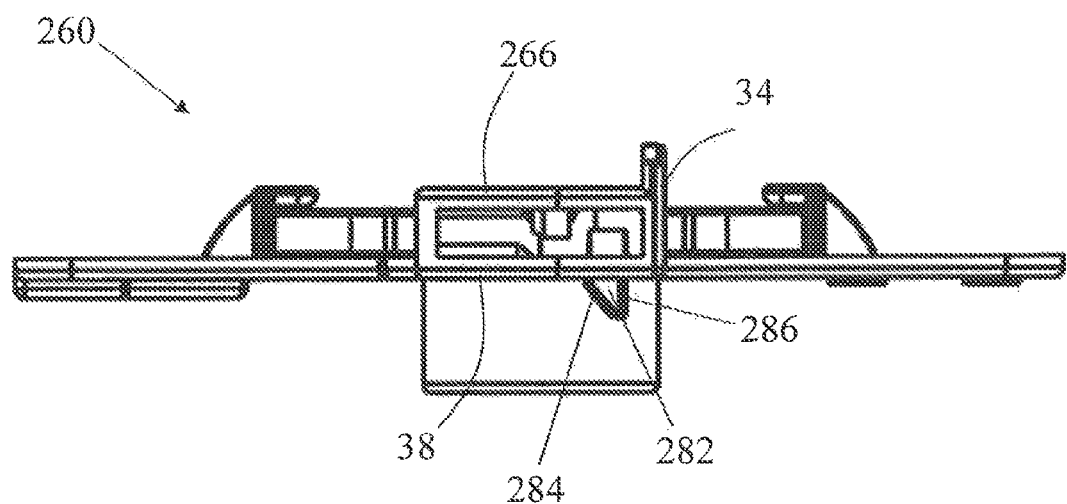
FIG. 21 is a tip end view of the key blank carrier of FIG. 20.
Figure 22:
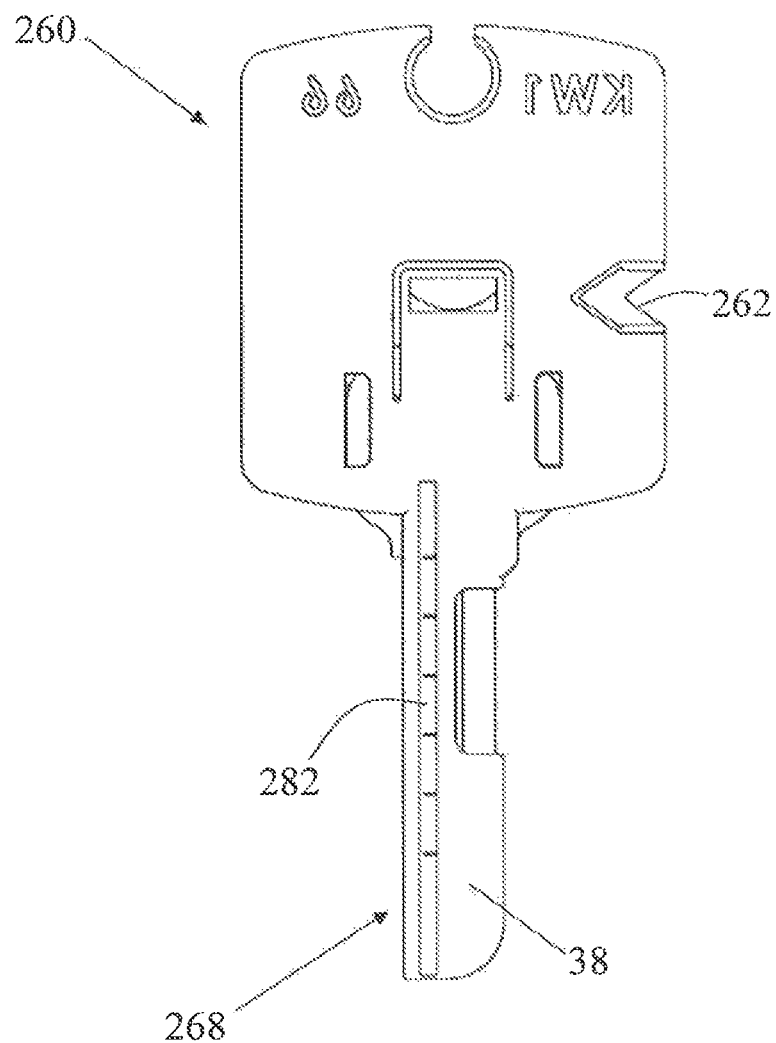
FIG. 22 is a back side view of the key blank carrier of FIG. 20.

FIG. 21 illustrates a tip end view of the particular implementation illustrated in FIG. 20. In this particular implementation, a key blank cutter alignment feature 282 extends from the surface of the back side wall 38 with a first side 284 extending at an angle of about 45 degrees relative to the surface of the back side wall 38 and a second side 286 extending at an angle of about 90 degrees relative to the surface of the back side wall 38. In other implementations, only a first side 284 is necessary and it is contemplated that the first side 284 may extend at an angle of at least 20 degrees relative to the surface of the back side wall 38. The location of the key blank cutter alignment feature 282 need not be located on the back side wall 38 and may be located anywhere on the key blank carrier 260. In a particular implementation, the key blank cutter alignment feature 282 is integrally formed with the key blank carrier 260. In a particular implementation, the key blank cutter alignment feature 282 extends lengthwise along at least a portion of back side wall 38 of the key blank sleeve 268, for example, as illustrated in FIG. 22. One advantage of using a key blank cutter alignment feature is to accurately align a key blank carrier into the key blank cutter to assist in creating a more accurate and precise cutting of the key blank. As a portion of a key blank cutter presses against the first side 284 of the key blank cutter alignment feature 282 of FIG. 20, the key blank carrier 260 tends to move in a direction toward the spine side wall 34 to assist in aligning the key blank carrier 260 within the key blank cutter. The angled wall on the first side 284 of the key blank carrier alignment feature 282 reduces the precision required within manufacturing tolerances between the key blank cutter and key blank carriers.

Figure 23:
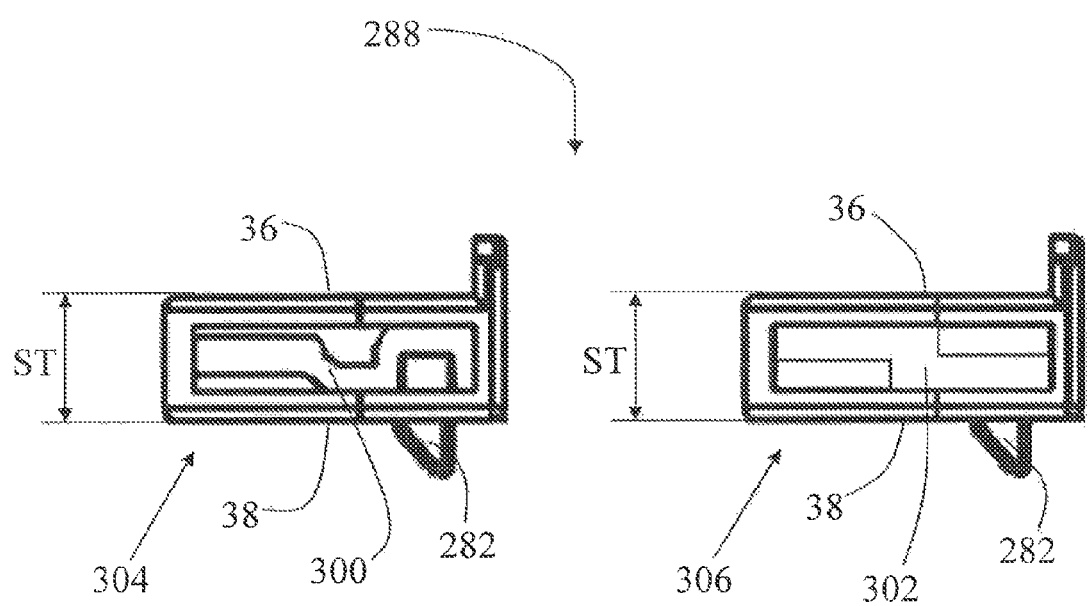
FIG. 23 illustrates tip end views of different individual key blank carriers in a system of key blank carriers with a uniform sleeve thickness.

FIG. 23 illustrates a particular implementation of a system 288 of individual key blank carriers for aligning key blanks 300, 302 within a key blank cutter. The system 288 provides a uniform sleeve thickness ST for all key sleeves 306, 308 in the system 288. The uniform sleeve thickness ST allows for a more precise and consistent fit in the key blank cutter regardless of the type of key blank. Unifying the sleeve thickness ST between various key blank carriers for different key blanks reduces the tendency of the key blank carriers and key blanks to rotate while the key blank is being cut in the key blank cutter under rotational pressure from the key blank cutter. In this system, the thickness of portions of the front and/or back walls 36, 38 of the key sleeve may vary to account for different sizes and dimensions of key blades and yet maintain a uniform sleeve thickness 290. Although the particular implementation of the system 288 illustrated in FIG. 23 only shows two embodiments, those of ordinary skill in the art will readily be able to modify the embodiments from the teachings herein to adapt to any other key size or shape.

Although particular examples of key blank carriers embodied as key blank blade sleeves illustrate and discuss alignment features embodied as ridges parallel to the key blank blade, other alignment features are contemplated and possible for the various embodiments. For example, and without limitation, alignment features may be embodied as knobs, ramps, grooves, apertures, shaped key blank carrier portions and the like. Although particular sizes, shapes, lengths, widths and positioning of particular key blank and key blank carrier alignment features are illustrated, it will be understood by those of ordinary skill in the art that such examples are non-limiting and that alignment features in many other locations and having many other configurations, sizes, shapes, lengths, widths and positioning will function equivalently to those described herein. Such alternatives should also be considered as equivalent to those described and to the extent they would be understood from this disclosure as meeting the functional capacity as discussed herein, should be considered incorporated within this disclosure.

The components used for a key blank carrier, such as those shown herein, may be made of conventional materials used to make goods similar to these in the art, such as, by non-limiting example, polycarbonate, polyvinylchloride (PVC) or other rigid or flexible rubbers, plastics, or resins, aluminum, steel, other metals, carbon fiber, Kevlar, other composite materials. Those of ordinary skill in the art will readily be able to select appropriate materials and manufacture these products from the disclosures provided herein.

The implementations listed here, and many others, will become readily apparent from this disclosure, From this, those of ordinary skill in the art will readily understand the versatility with which this disclosure may be applied.

The components included in particular implementations of key blanks and carriers may be formed of any of many different types of materials or combinations that can readily be formed into shaped objects and that are consistent with the intended operation of a key blank or carrier. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the various components forming a particular implementation of a key blank or carrier may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that implementations are not limited to the specific components disclosed herein, as virtually any components consistent with the intended operation of a method and/or system implementation for a key blank or carrier may be utilized. Accordingly, for example, although particular key blanks, carriers and other components may be disclosed, such components may comprise any shape, size, style, type, model, version, class, grade, measurement, concentration, material, weight, quantity, and/or the like consistent with the intended operation of a method and/or system implementation for a key blank or carrier may be used.

In places where the description above refers to particular implementations of key blank or carrier, it should be readily apparent that a number of modifications may be made without departing from the spirit thereof and that these implementations may be applied to other key blanks and carriers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A method of cutting a key blank to form a duplicate key, the method comprising:
   inserting a key blank positioned in a key blank carrier into an opening in a key blank cutter;
   cutting a key bit pattern of a master key into the key blank with the key blank cutter;
   removing the cut key blank and key blank carrier from the key blank cutter;
   separating the cut key blank from the key blank carrier; and
   moving a blade of the cut key blank along a key blank burr removal opening along a first edge of the key blank carrier until at least one burr is removed from the blade of the cut key blank.

2. The method of claim 1, wherein the key blank burr removal opening comprises a beveled edge extending for at least a portion of the opening.

3. The method of claim 1, further comprising:
   mechanically engaging a portion of the key blank cutter with at least one key blank cutter alignment feature projecting from a surface of the key blank carrier; and
   aligning the key blank with the key blank cutter.

4. The method of claim 3, wherein the at least one key blank cutter alignment feature comprises a first side projecting from the surface of the key blank carrier at an angle of at least 20 degrees relative to the surface and converging toward a second side projecting from the surface of the key blank carrier at an angle of about 90 degrees.

5. The method of claim 3, wherein the key blank cutter alignment feature is integrally formed with the body of the key blank carrier.

6. The method of claim 1, wherein the key blank burr removal opening is V-shaped.

7. The method of claim 1,
   wherein the body of the key blank carrier comprises an elongated sleeve defining at least a portion of a key blank recess,
   wherein the key blank recess comprises at least two walls and is sized and shaped to securely receive at least a portion of the key blank within the recess,
   wherein the sleeve further comprises a tip end and a head end, the head end comprising a substantially planar surface, and the tip end being at least partly formed by the at least two walls of the key blank recess and at least two additional walls, and
   wherein the tip end at least two walls and at least two additional walls define key blank carrier front and back sides and key blank carrier bit and spine sides respectively, the key blank carrier front side comprising at least one aperture extending through the key blank carrier front side along an edge of the front side bordering the key blank carrier spine side.

8. The method of claim 7, wherein the at least one aperture extending through the key blank carrier front side comprises at least two apertures extending through the key blank carrier front side along the edge of the front side bordering the key blank carrier spine side.

9. The method of claim 1,
   wherein the body of the key blank carrier comprises an elongated sleeve defining at least a portion of a key blank recess,
   wherein the key blank recess comprises at least two walls and is sized and shaped to securely receive at least a portion of the key blank within the recess,
   wherein the sleeve further comprises a tip end and a head end, the head end comprising a substantially planar surface, the tip end being at least partly formed by the at least two walls and at least two additional walls, and
   wherein the tip end at least two walls and at least two additional walls define key blank carrier front and back sides and key blank carrier bit and spine sides respectively, the key blank carrier front side comprising at least one aperture extending through the key blank carrier front side along an edge of the front side on the key blank carrier bit side.

10. The method of claim 1,
    wherein the body of the key blank carrier comprises an elongated sleeve defining at least a portion of a key blank recess, wherein the key blank recess comprises at least two walls and is sized and shaped to securely receive at least a portion of the key blank within the recess, wherein the sleeve further comprises a tip end and a head end, the head end comprising a substantially planar surface, the tip end being at least partly formed by the at least two walls and at least two additional walls, wherein the tip end at least two walls and at least two additional walls define key blank carrier front and back sides and key blank carrier bit and spine sides respectively, the key blank carrier front side comprising at least one aperture extending through the key blank carrier front side along an edge of the front side on the key blank carrier bit side, the key blank carrier bit side further comprising a shoulder band adjacent to the head end between the head end and the at least one aperture, the shoulder band extending from the front side of the key blank carrier to the back side of the key blank carrier.

* * * * *